(12) United States Patent
Suenari et al.

(10) Patent No.: US 12,392,788 B2
(45) Date of Patent: *Aug. 19, 2025

(54) AUTOMATIC ANALYZER

(71) Applicant: HITACHI HIGH-TECH CORPORATION, Tokyo (JP)

(72) Inventors: Tsukasa Suenari, Tokyo (JP); Taichiro Yamashita, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 913 days.

This patent is subject to a terminal disclaimer.

(21) Appl. No.: 17/599,002

(22) PCT Filed: Feb. 6, 2020

(86) PCT No.: PCT/JP2020/004541
§ 371 (c)(1),
(2) Date: Sep. 28, 2021

(87) PCT Pub. No.: WO2020/208919
PCT Pub. Date: Oct. 15, 2020

(65) Prior Publication Data
US 2022/0178955 A1 Jun. 9, 2022

(30) Foreign Application Priority Data

Apr. 11, 2019 (JP) ................. 2019-075380

(51) Int. Cl.
*E05B 65/52* (2006.01)
*B01L 3/00* (2006.01)
(Continued)

(52) U.S. Cl.
CPC ............ *G01N 35/00* (2013.01); *B01L 3/5055* (2013.01); *B01L 2200/141* (2013.01);
(Continued)

(58) Field of Classification Search
CPC ......... G01N 35/00; G01N 2035/00306; G01N 2035/00316; B01L 3/5055;
(Continued)

(56) References Cited

U.S. PATENT DOCUMENTS 11,927,032 B2 * 3/2024 Yamashita .......... E05B 47/0002
2013/0084212 A1 4/2013 Kurono et al.
(Continued)

FOREIGN PATENT DOCUMENTS

CN 1550182 A 12/2004
CN 102507964 A 6/2012
(Continued)

OTHER PUBLICATIONS

Machine-generation of English translation (Year: 2002).*
(Continued)

*Primary Examiner* — P. Kathryn Wright
(74) *Attorney, Agent, or Firm* — Baker Botts L.L.P.

(57) ABSTRACT

An automatic analyzer capable of improving maintainability by facilitating access to an interlock unit. The interlock unit includes an operation member configured to be movably supported between a lock position and a lock release position, and obstruct rotation to an open position of a cover; an
(Continued)

electromagnetic driving unit configured to drive the operation member, and a driving connecting unit configured to connect the operation member and the electromagnetic driving unit and drive the operation member by conveying an operation of the electromagnetic driving unit to the operation member. The interlock unit is provided to be attachable and detachable to and from the housing.

5 Claims, 31 Drawing Sheets

(51) Int. Cl.
    *G01N 35/00*     (2006.01)
    *G01N 37/00*     (2006.01)

(52) U.S. Cl.
    CPC . *B01L 2300/043* (2013.01); *B01L 2300/0609* (2013.01); *B01L 2300/0663* (2013.01)

(58) Field of Classification Search
    CPC ......... B01L 2200/141; B01L 2300/043; B01L 2300/0609; B01L 2300/0663; E05B 65/006; E05B 2047/0018; E05B 2047/0021; E05B 2047/0076; E05B 47/0002; E05B 47/023
    See application file for complete search history.

(56) References Cited

U.S. PATENT DOCUMENTS

| | | |
|---|---|---|
| 2014/0202828 A1 | 7/2014 | Ishigami et al. |
| 2017/0239660 A1* | 8/2017 | Baleriaux ................ B01L 1/00 |
| 2021/0062553 A1 | 3/2021 | Yamashita et al. |

FOREIGN PATENT DOCUMENTS

| | | | | |
|---|---|---|---|---|
| JP | H10-48195 A | | 2/1998 | |
| JP | H10-266674 A | | 10/1998 | |
| JP | 2002079000 A | * | 3/2002 | |
| JP | 2009287997 A | * | 12/2009 | |
| JP | 2013-076678 A | | 4/2013 | |
| WO | WO 2013/035471 A1 | | 3/2013 | |
| WO | WO-2018230198 A1 | * | 12/2018 | ............ G01N 35/00 |
| WO | WO 2019/225075 A1 | | 11/2019 | |

OTHER PUBLICATIONS

Machine-generation of English translation (Year: 2009).*
International Search Report, mailed Apr. 7, 2020, for International Application No. PCT/JP2020/004541.
Office Action, mailed Jan. 11, 2024, for Chinese Application No. 202080027530.9 (with English translation).

* cited by examiner

[FIG. 1]

[FIG. 4]
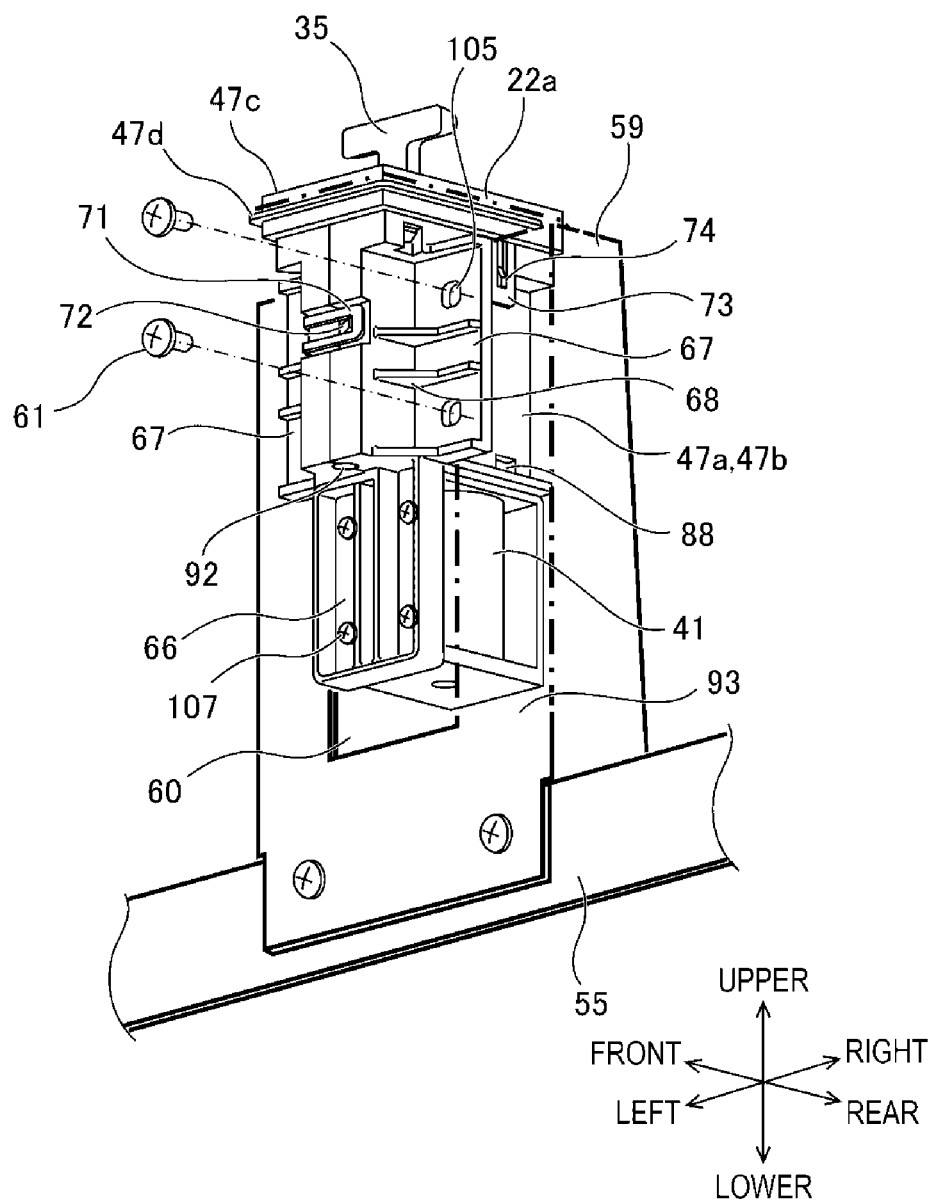

[FIG. 5A]
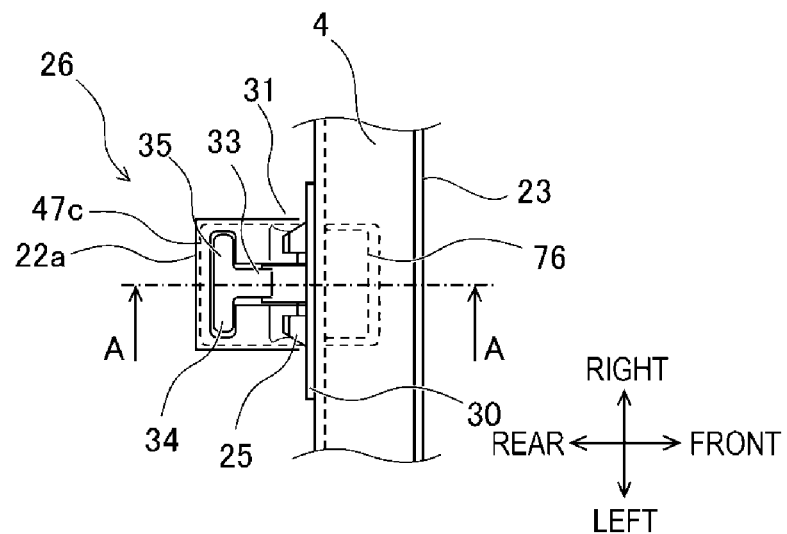
[FIG. 5B]
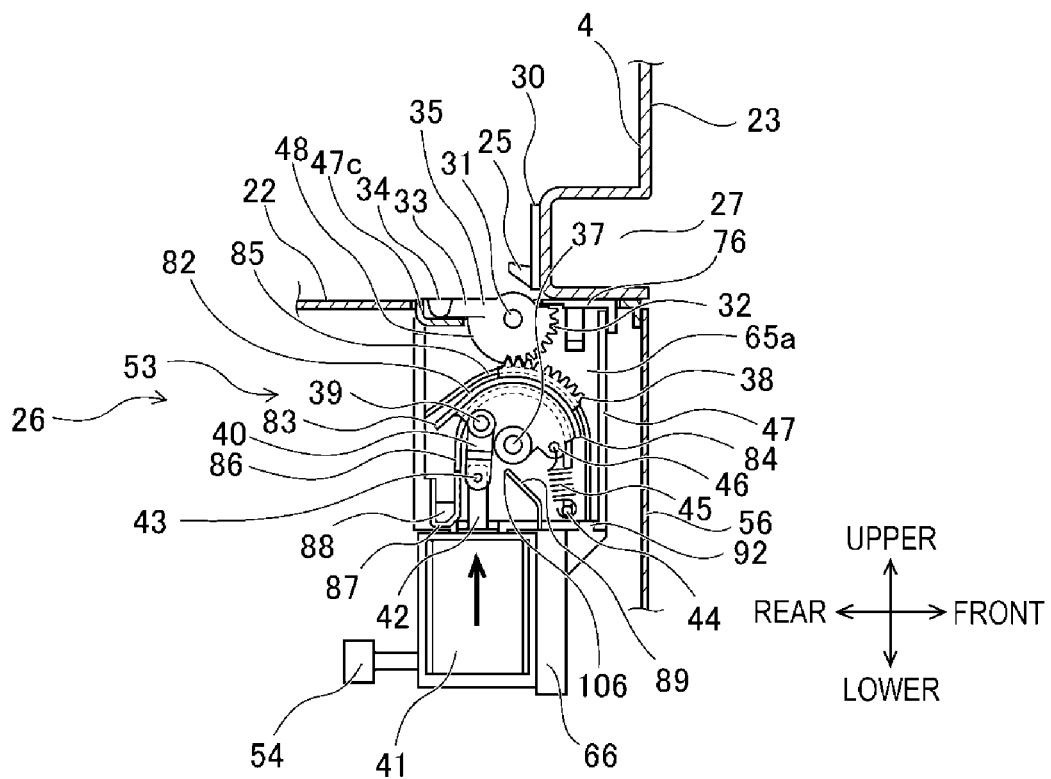

[FIG. 6]
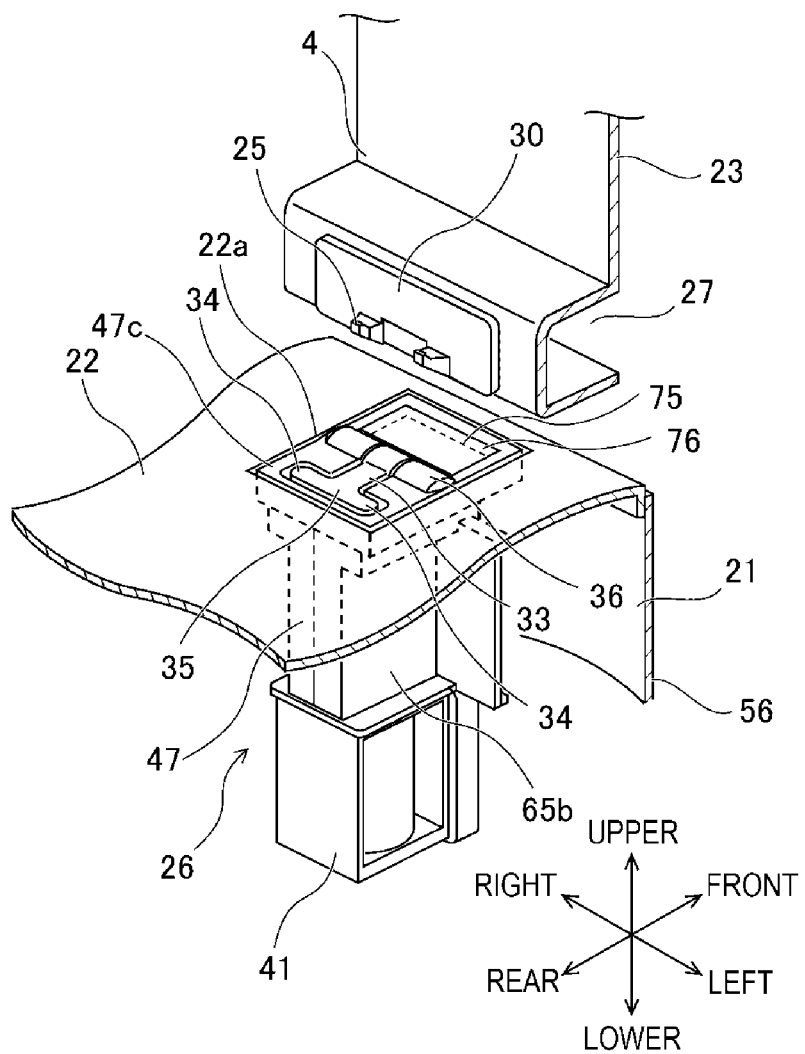

[FIG. 7]
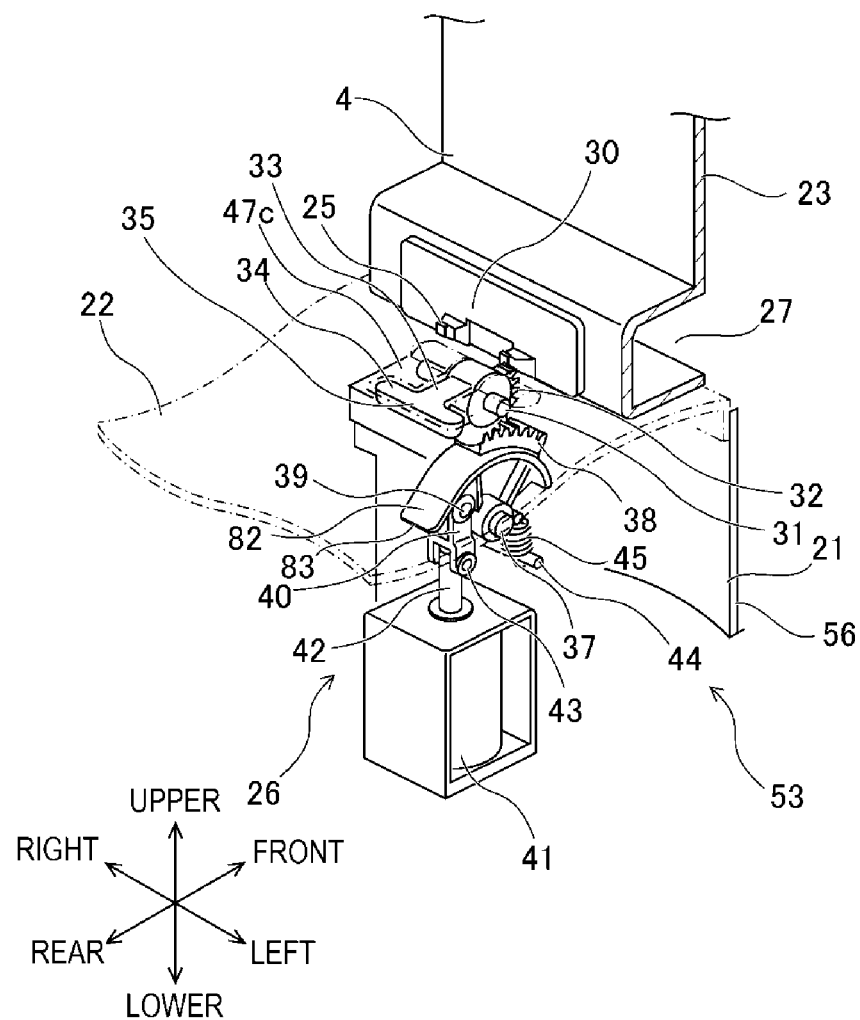

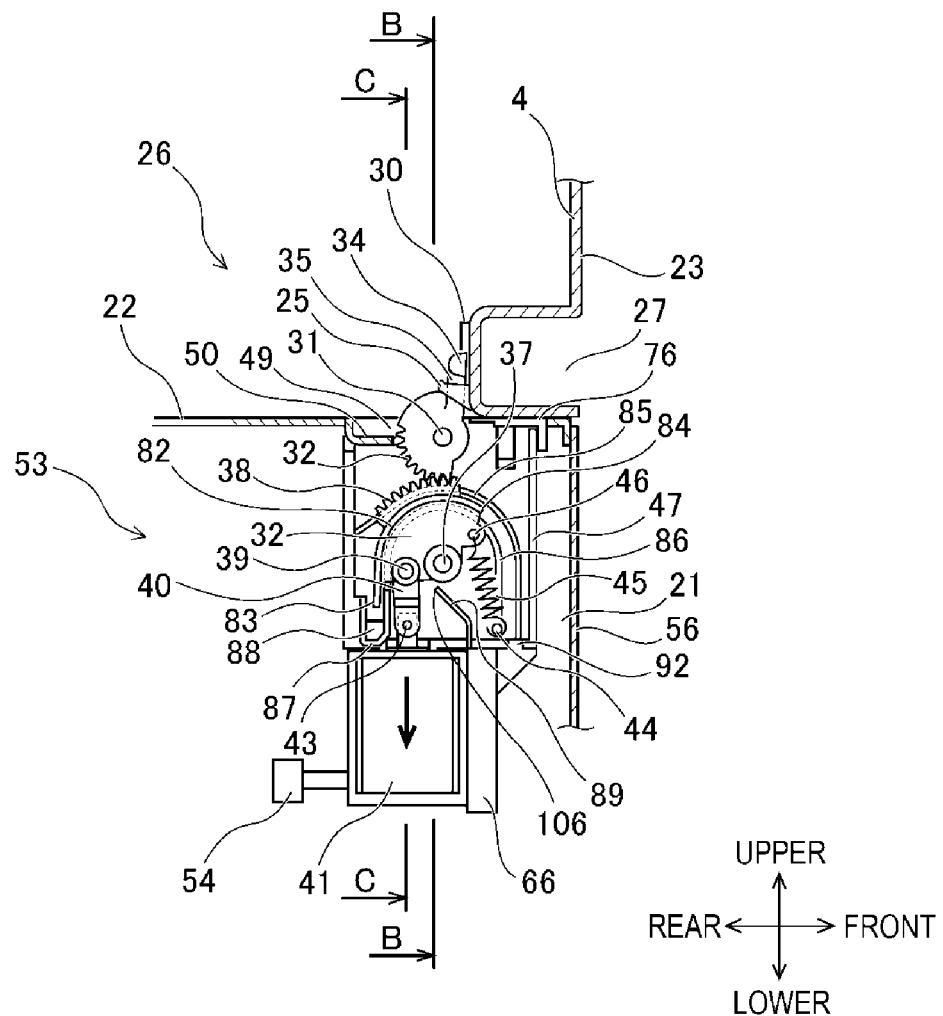
[FIG. 8]

[FIG. 9]
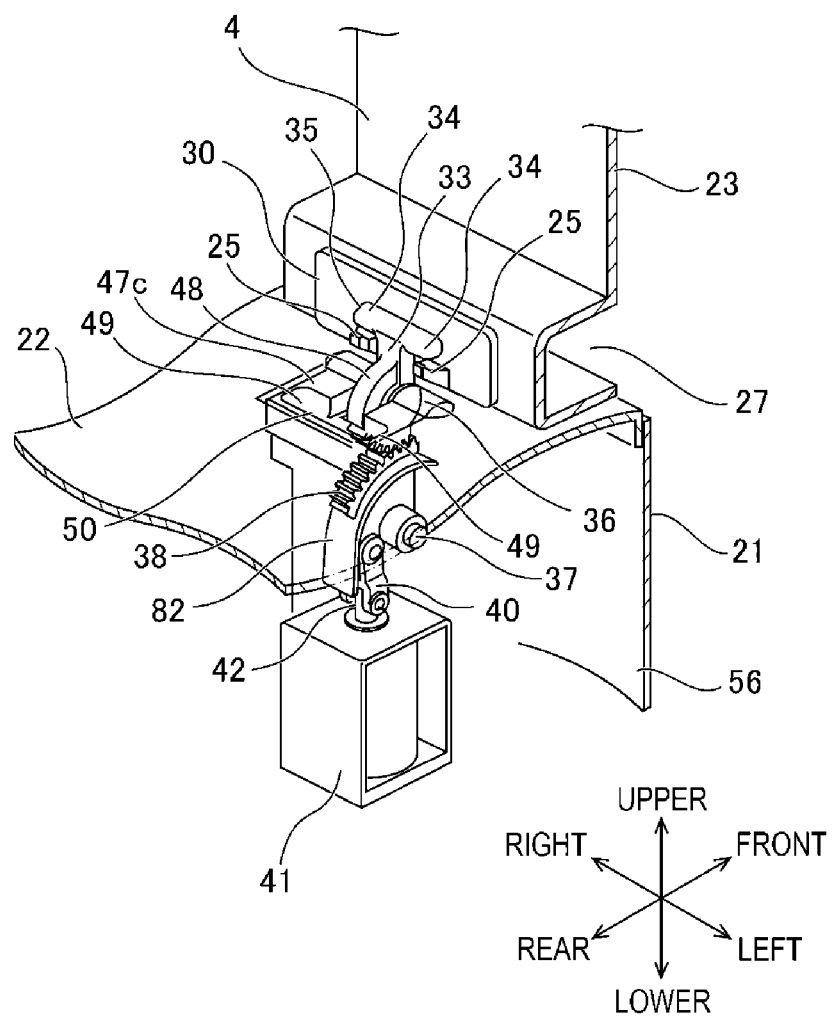

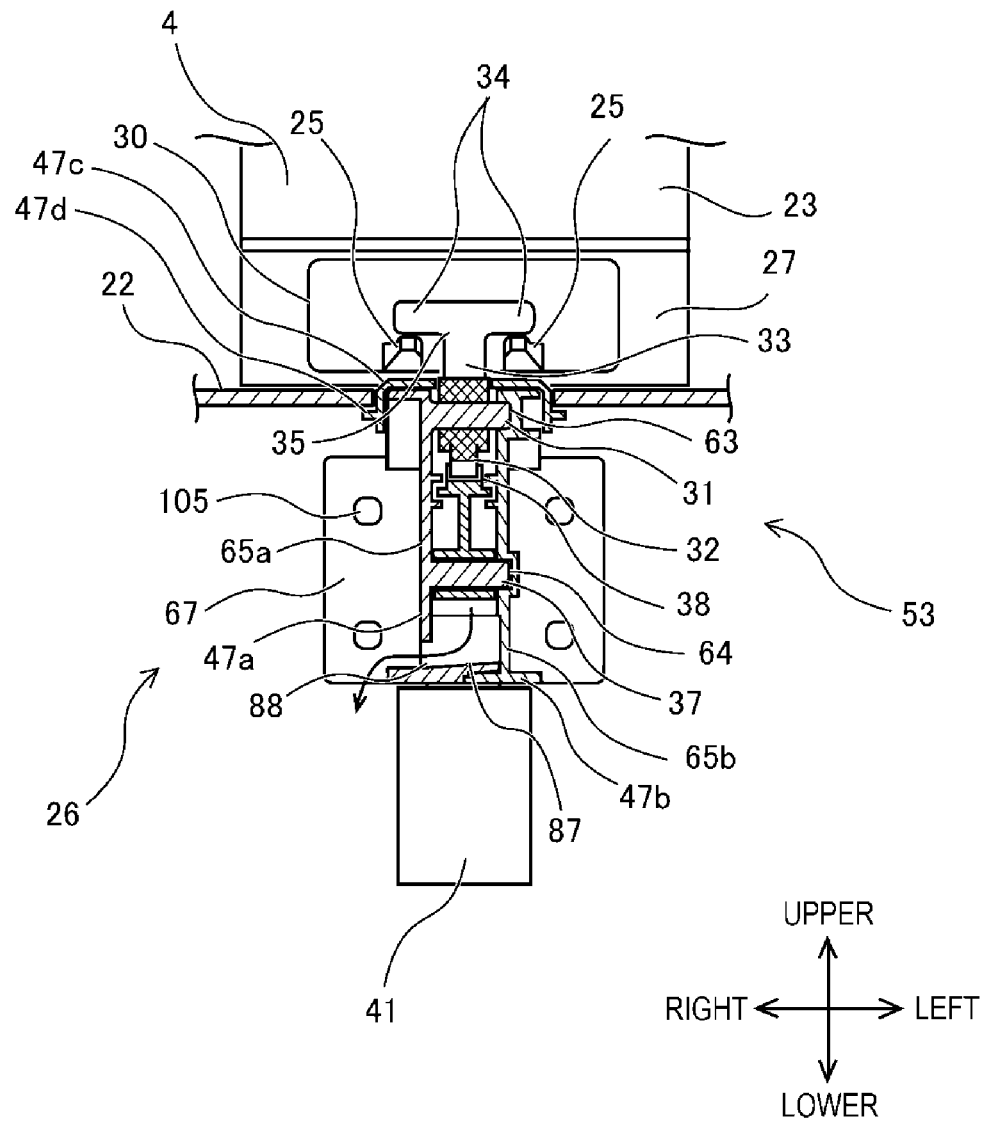
[FIG. 10]

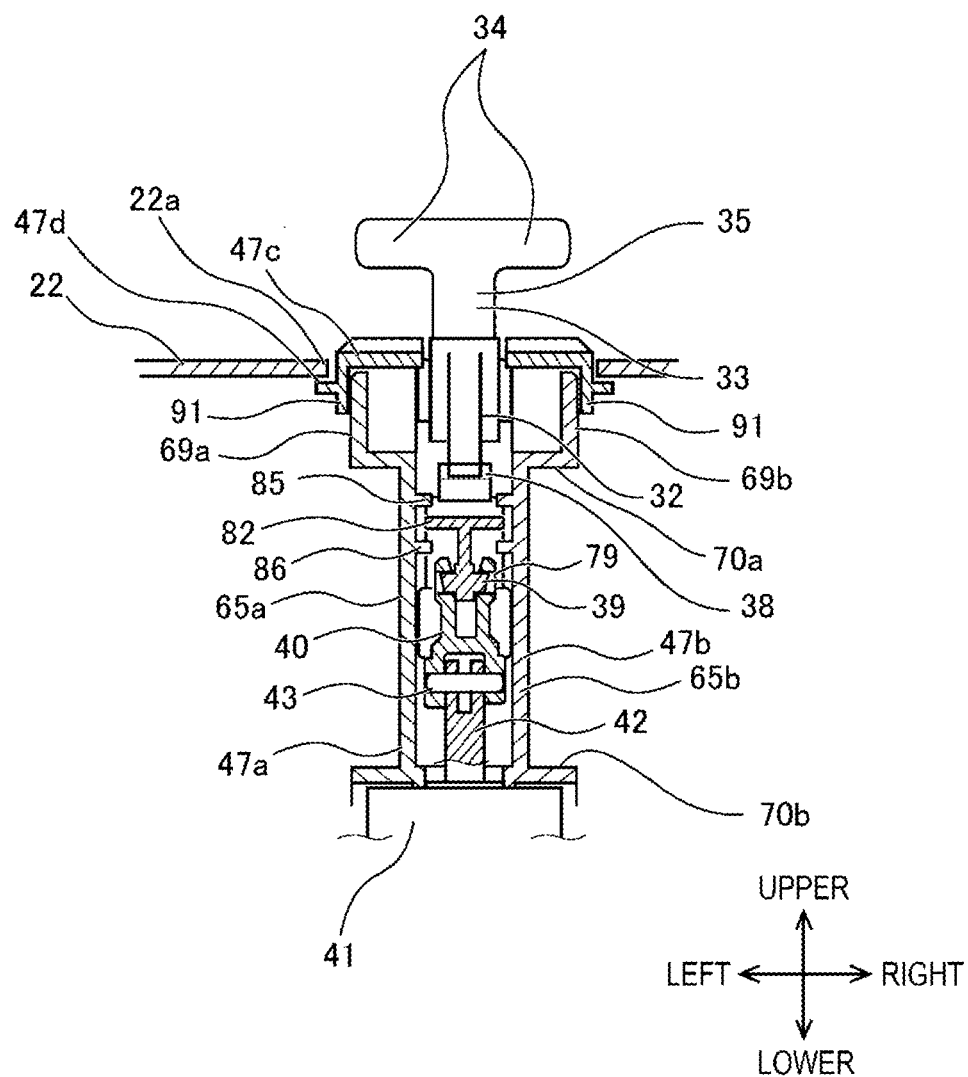
[FIG. 11]

[FIG. 12]
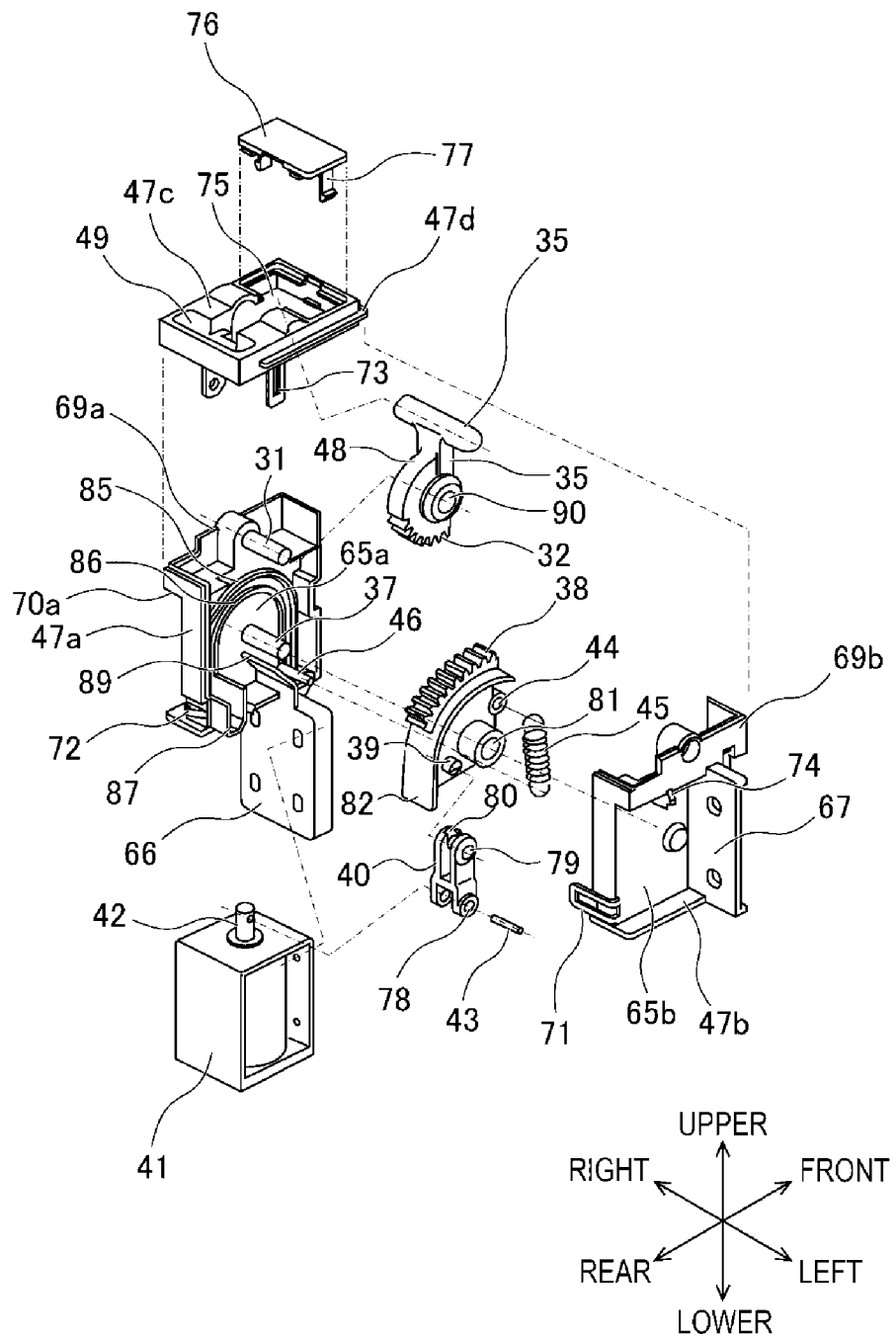

[FIG. 13]
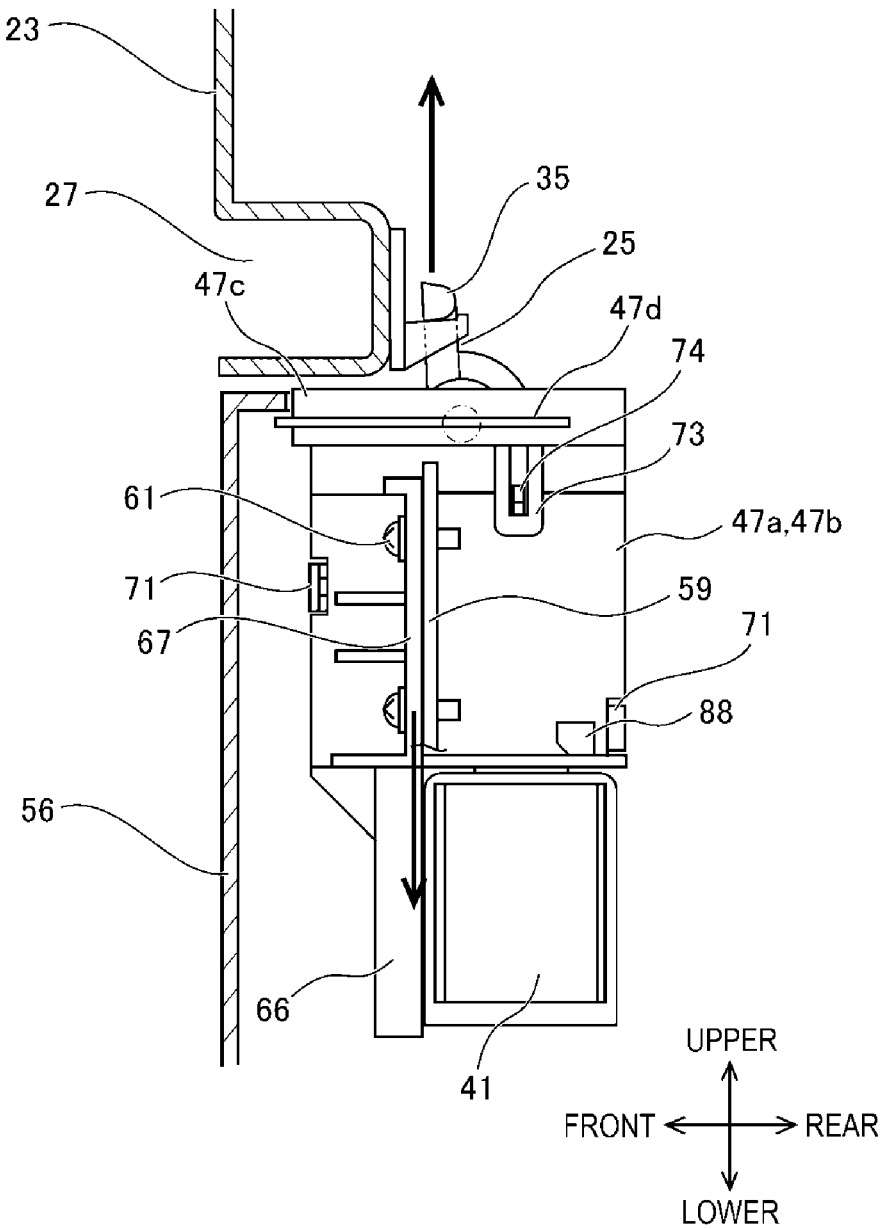

[FIG. 14]
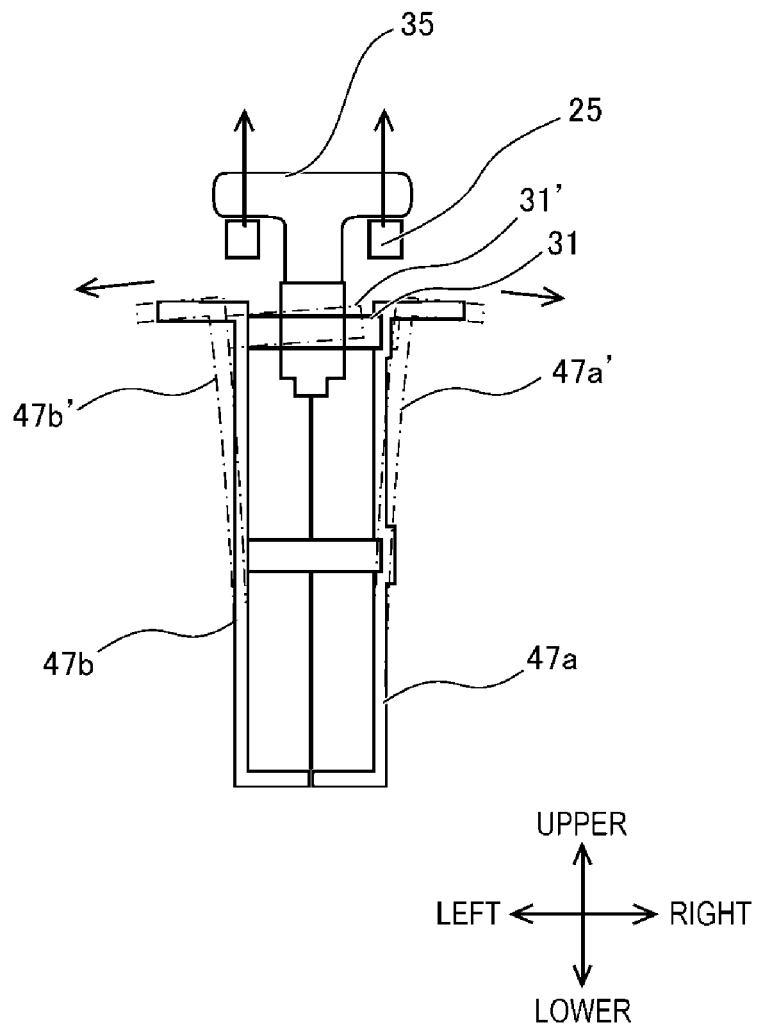

[FIG. 15]
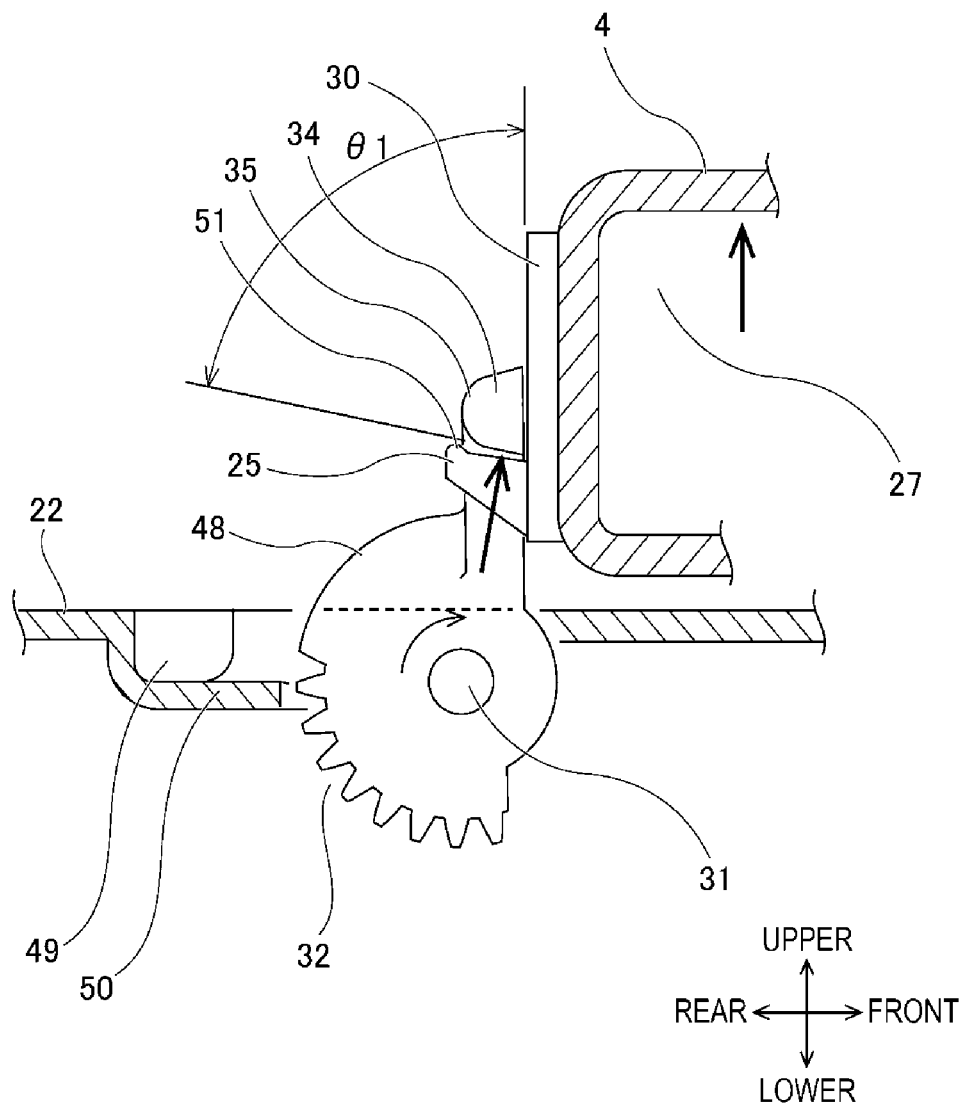

[FIG. 16]
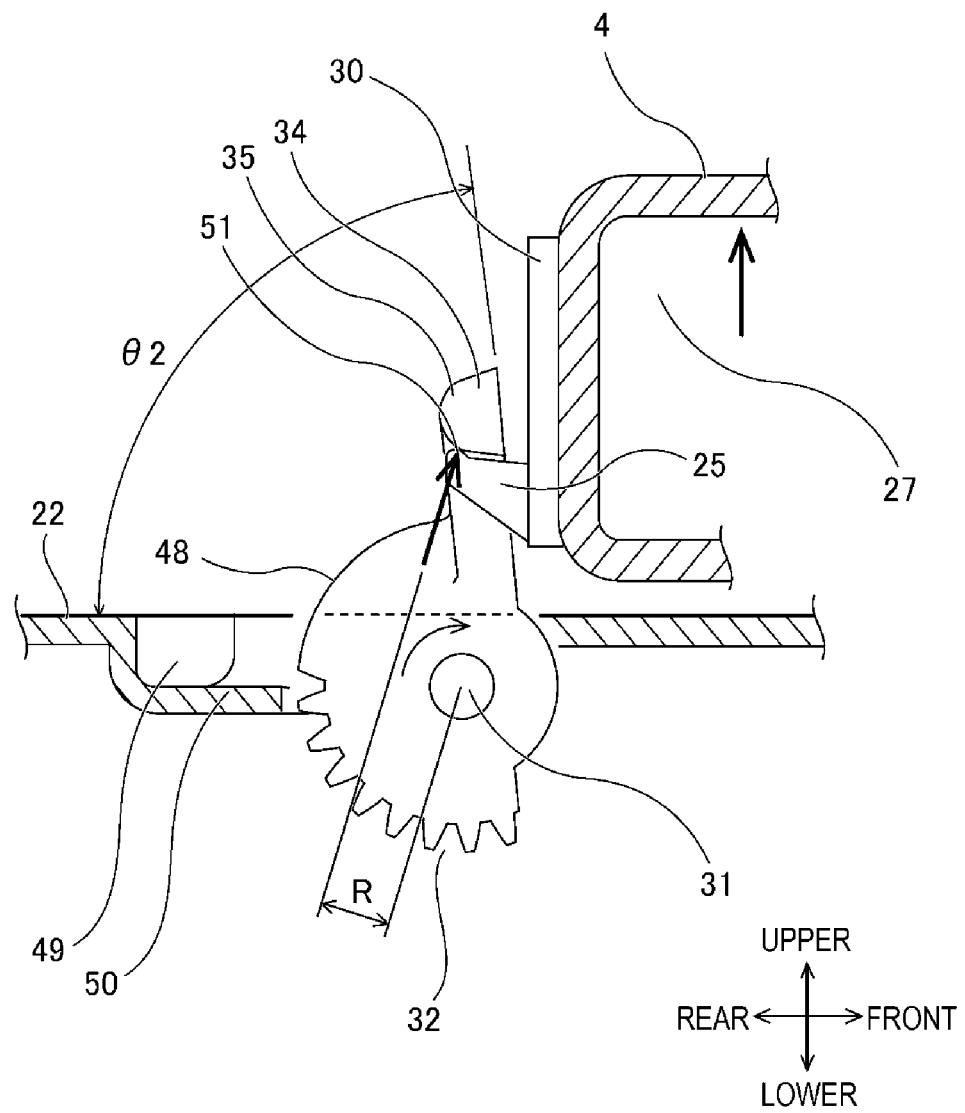

[FIG. 17A]
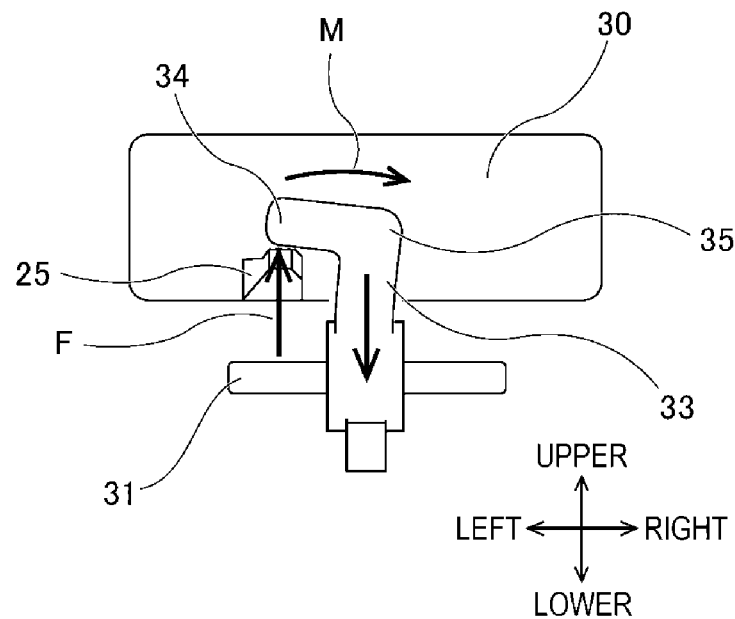
[FIG. 17B]
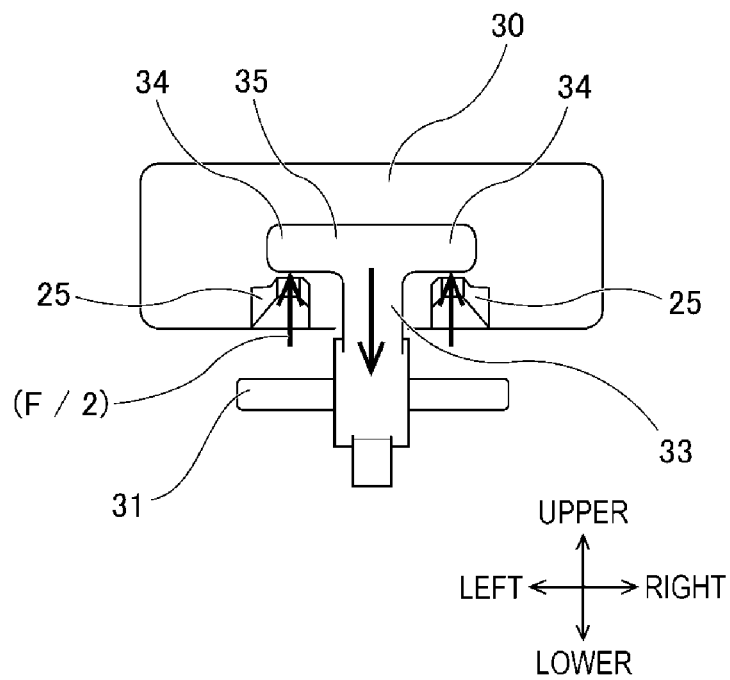

[FIG. 18A]
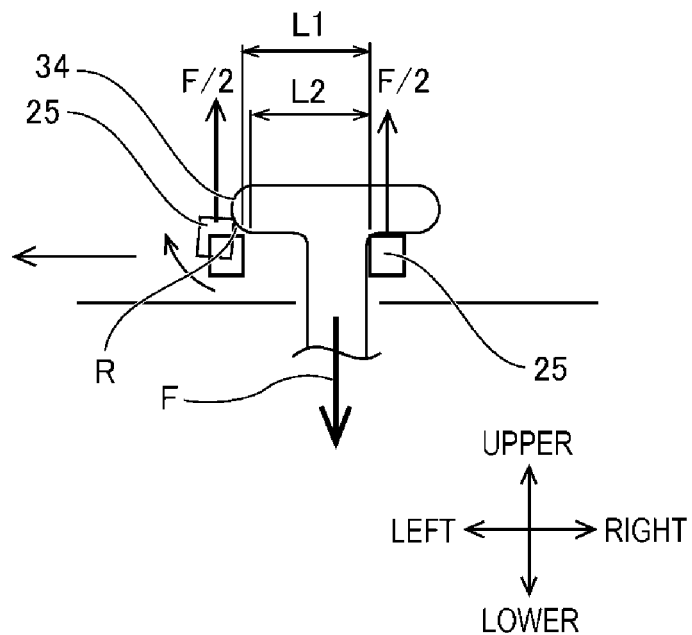
[FIG. 18B]
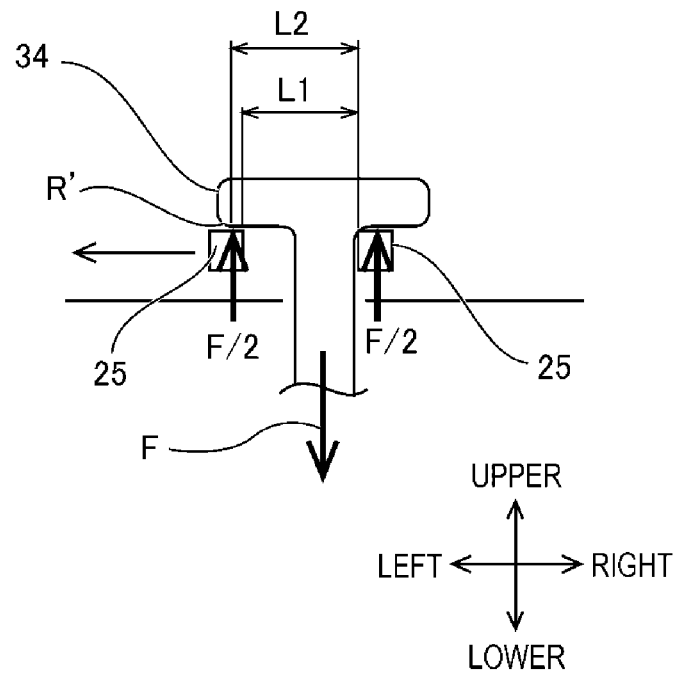

[FIG. 19]
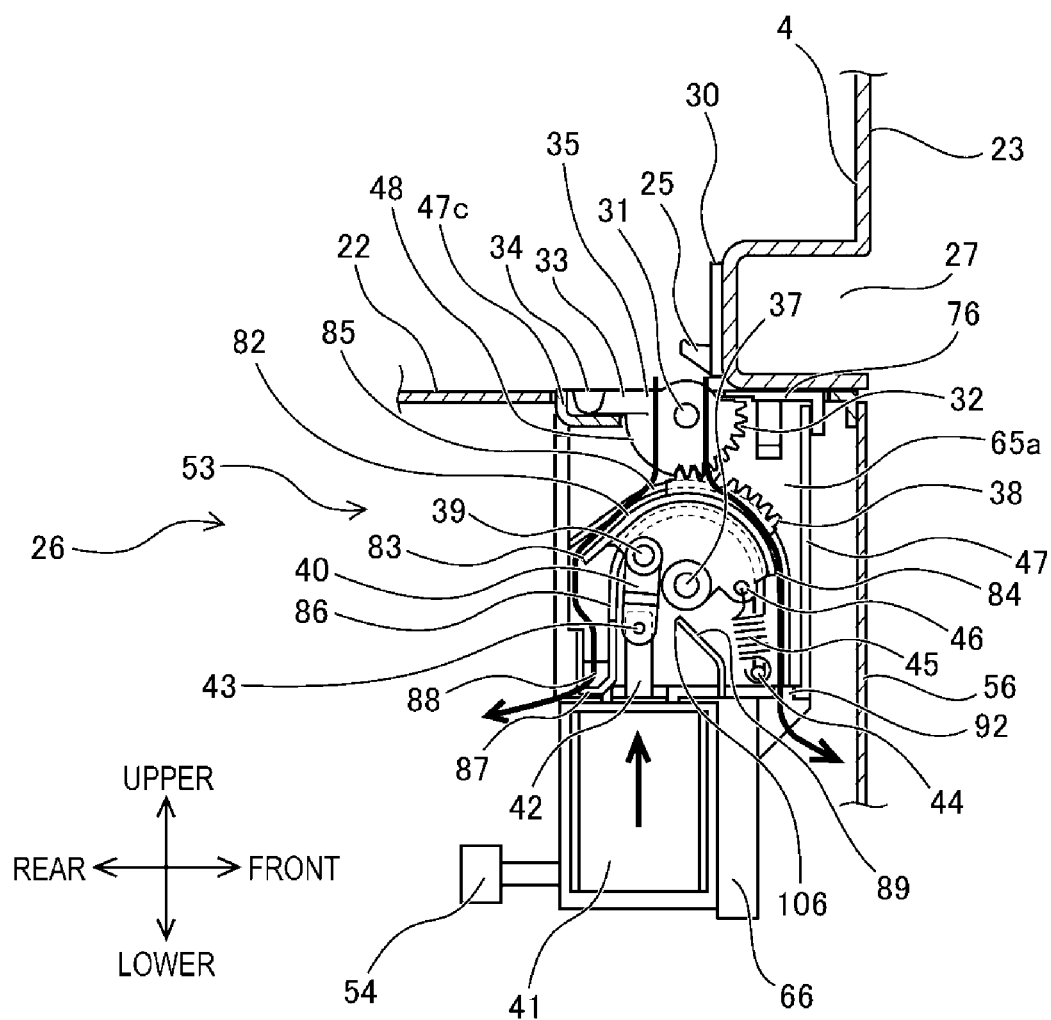

[FIG. 20]
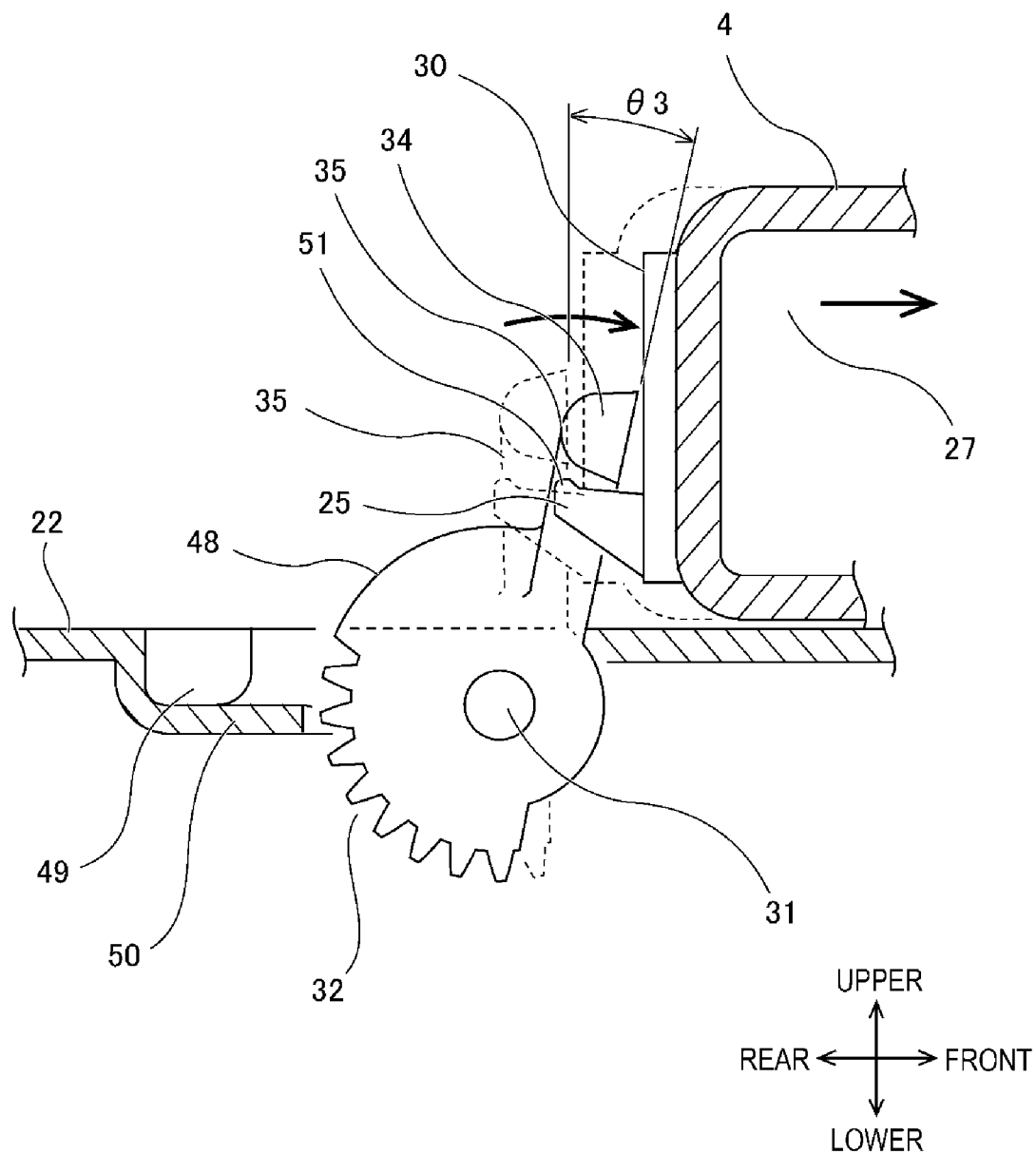

[FIG. 21]
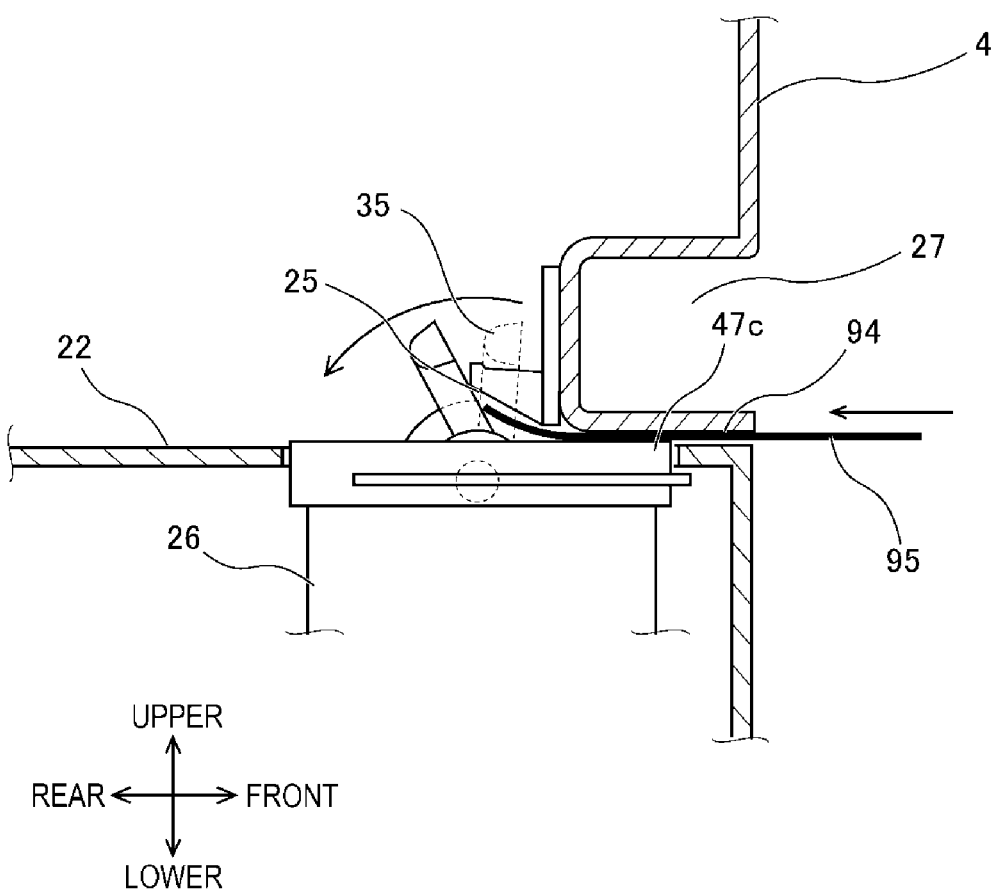

[FIG. 22]
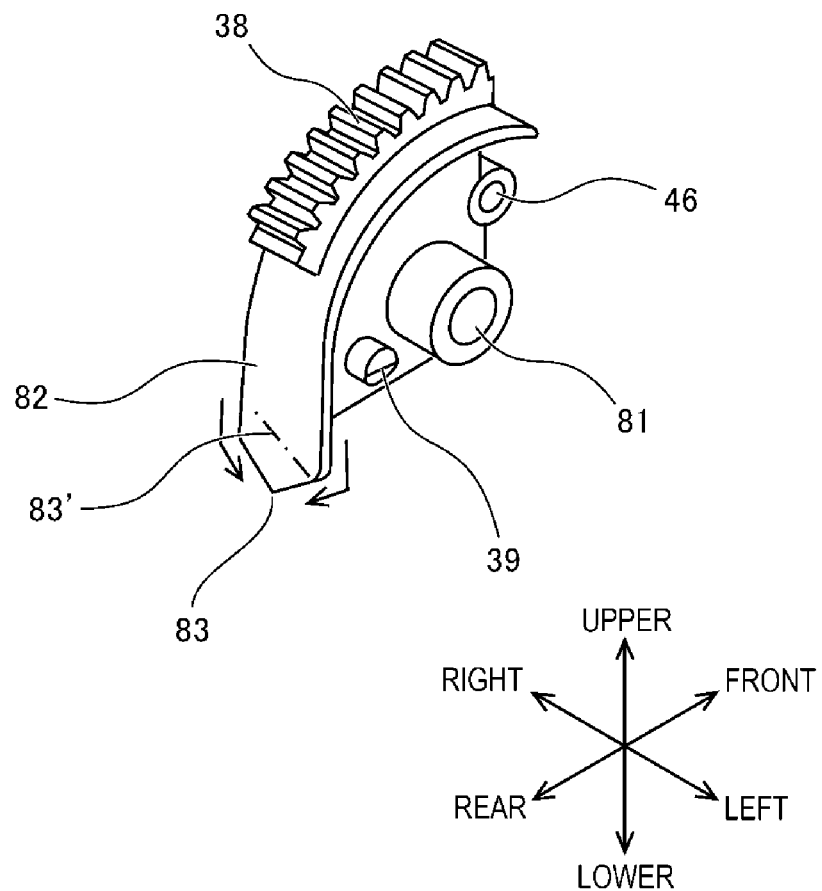

[FIG. 23]
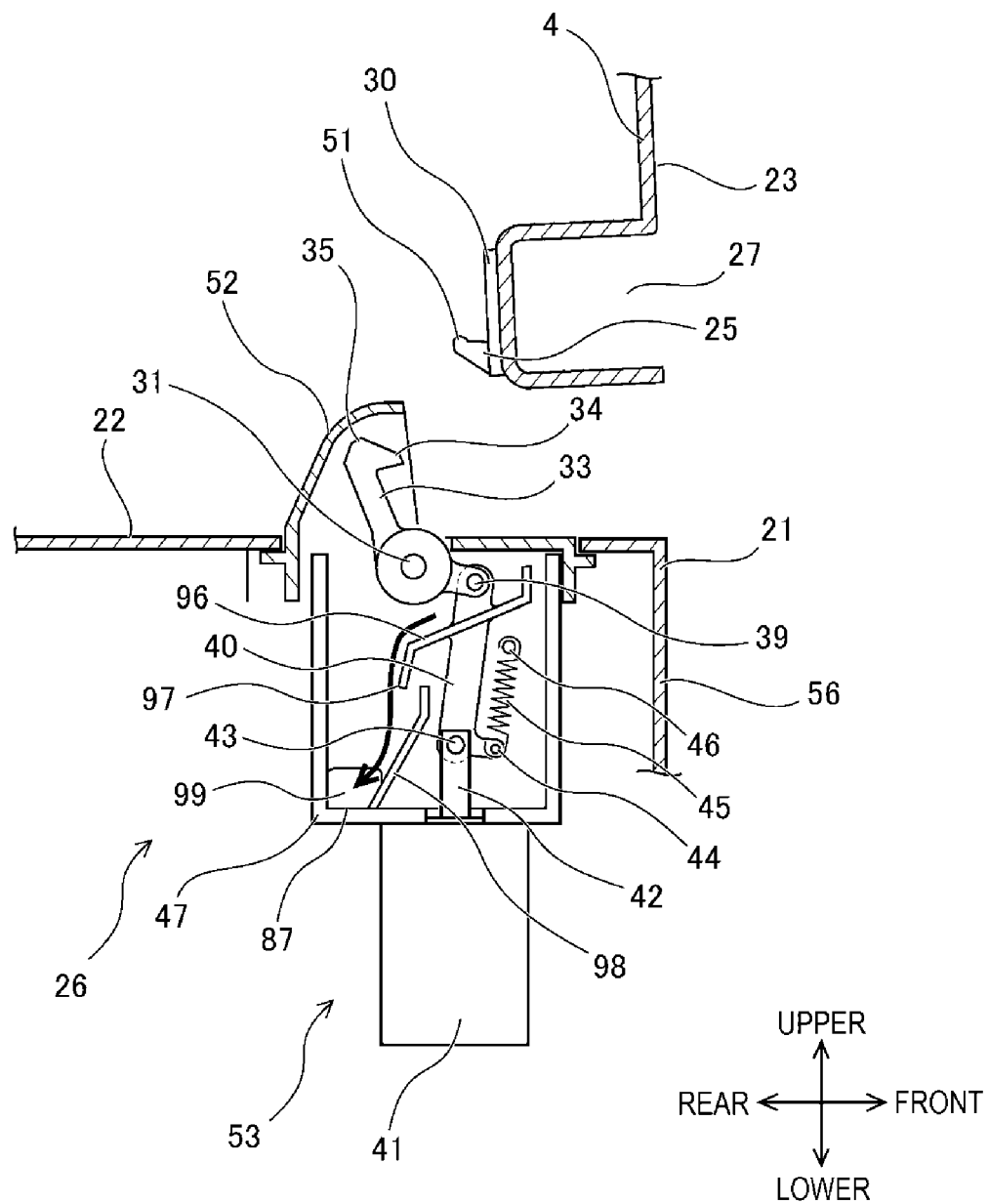

[FIG. 24]
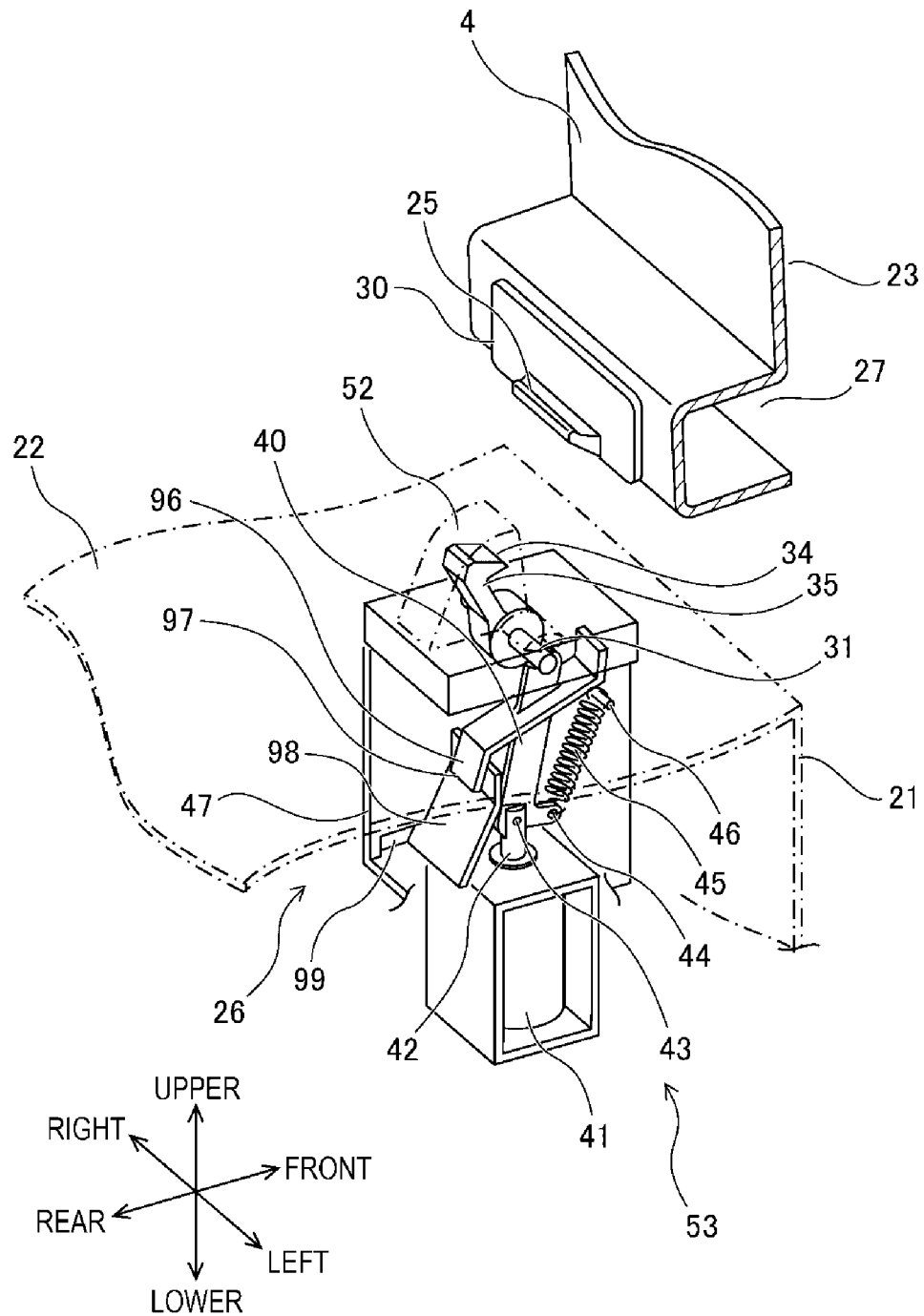

[FIG. 25]
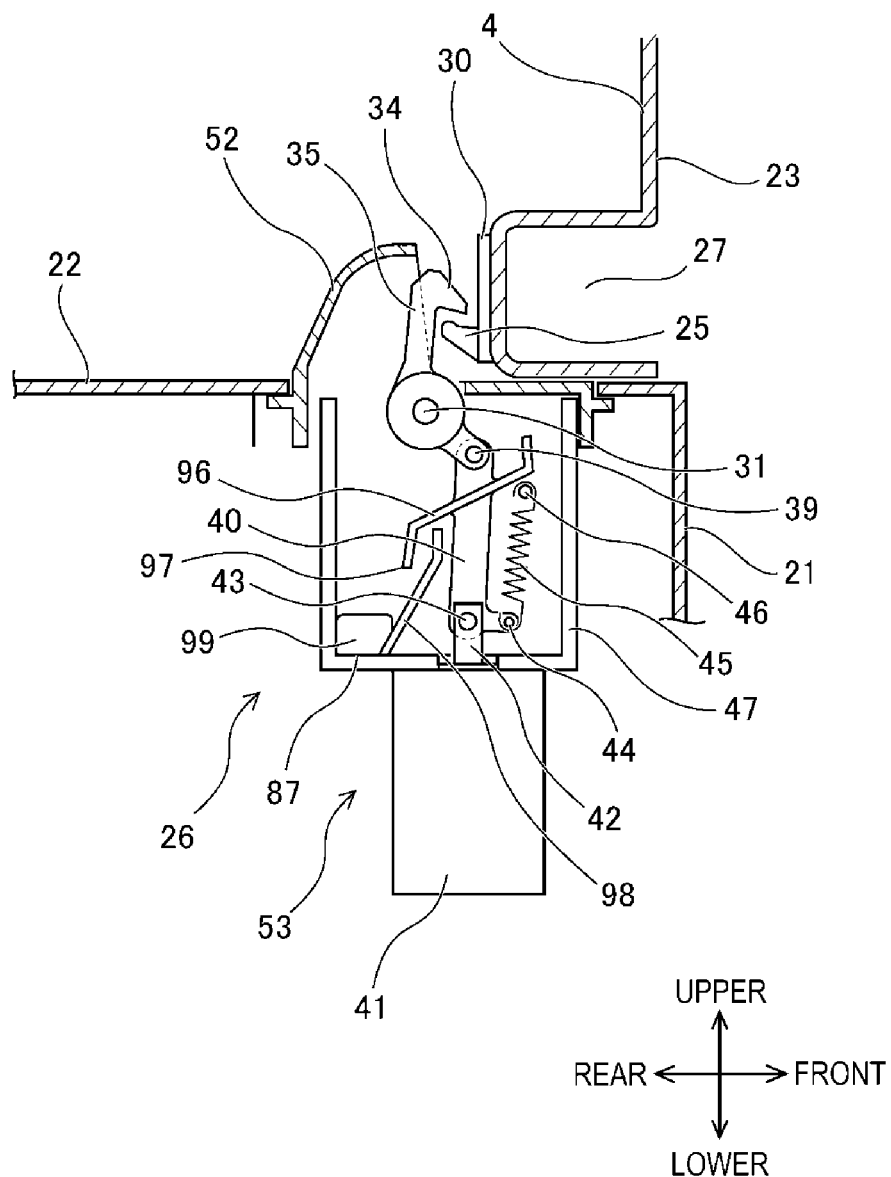

[FIG. 26]
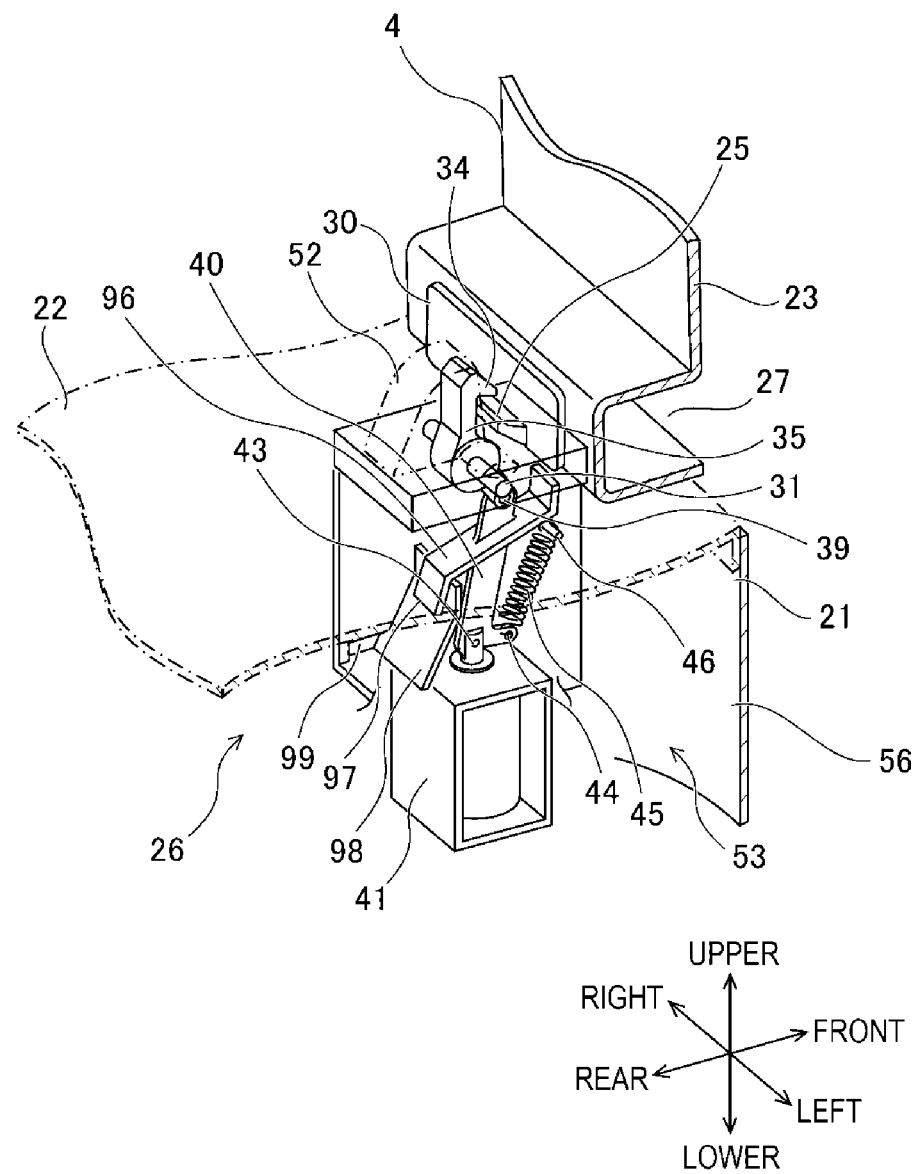

[FIG. 27A]
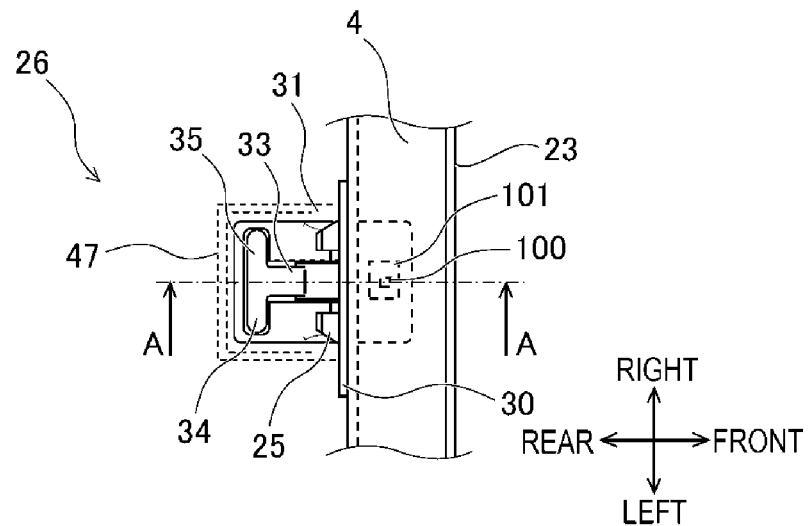
[FIG. 27B]
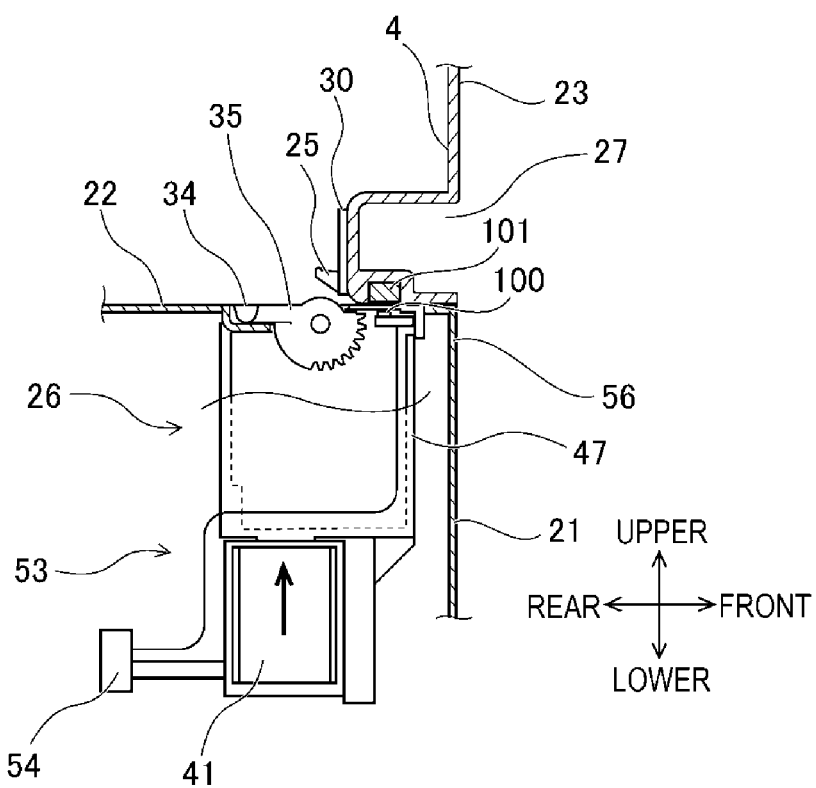

[FIG. 28]
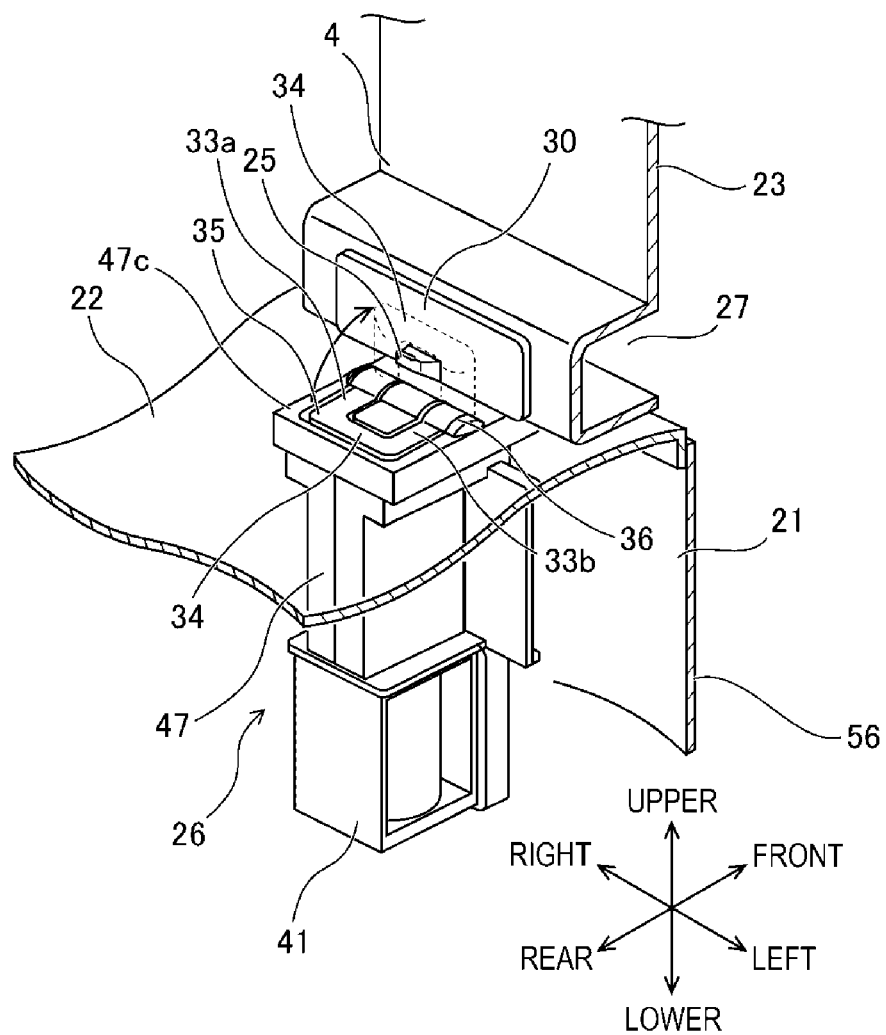

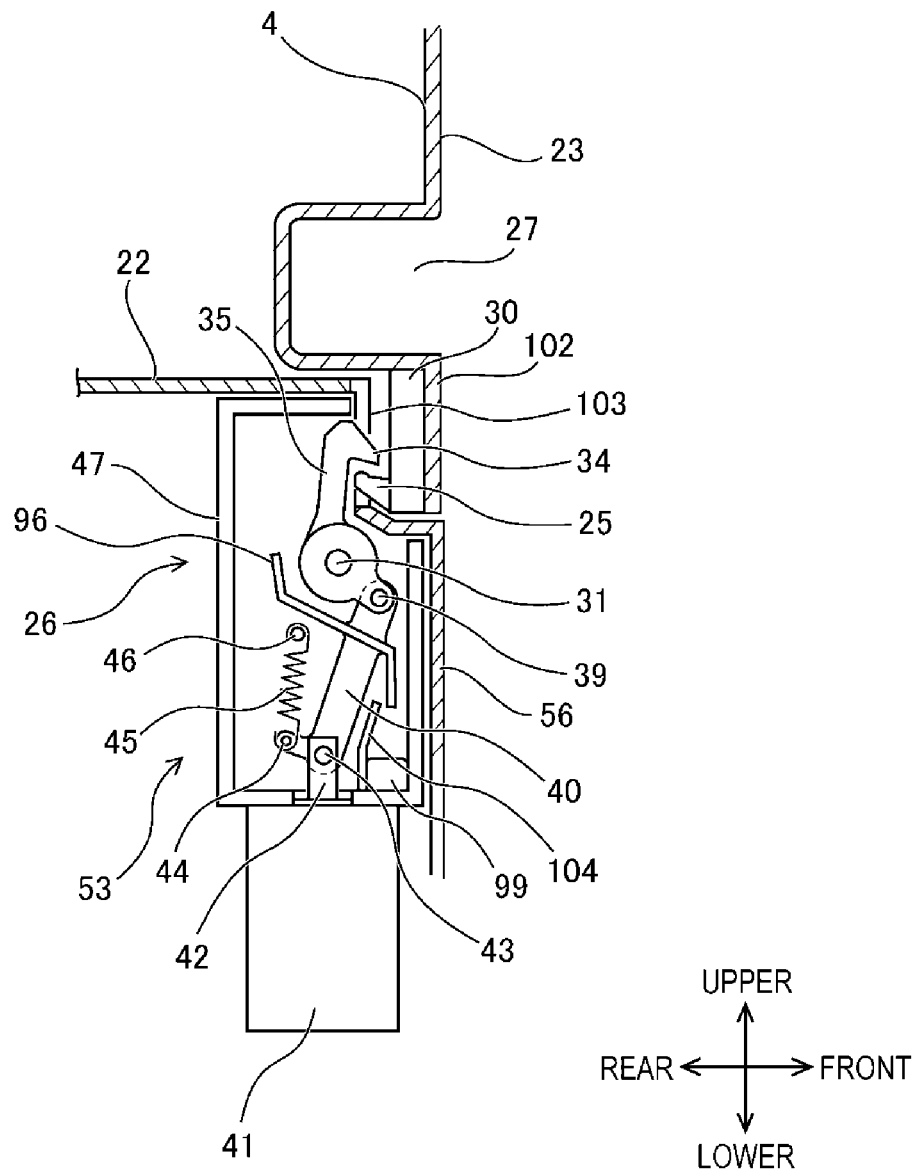
[FIG. 29]

[FIG. 30]
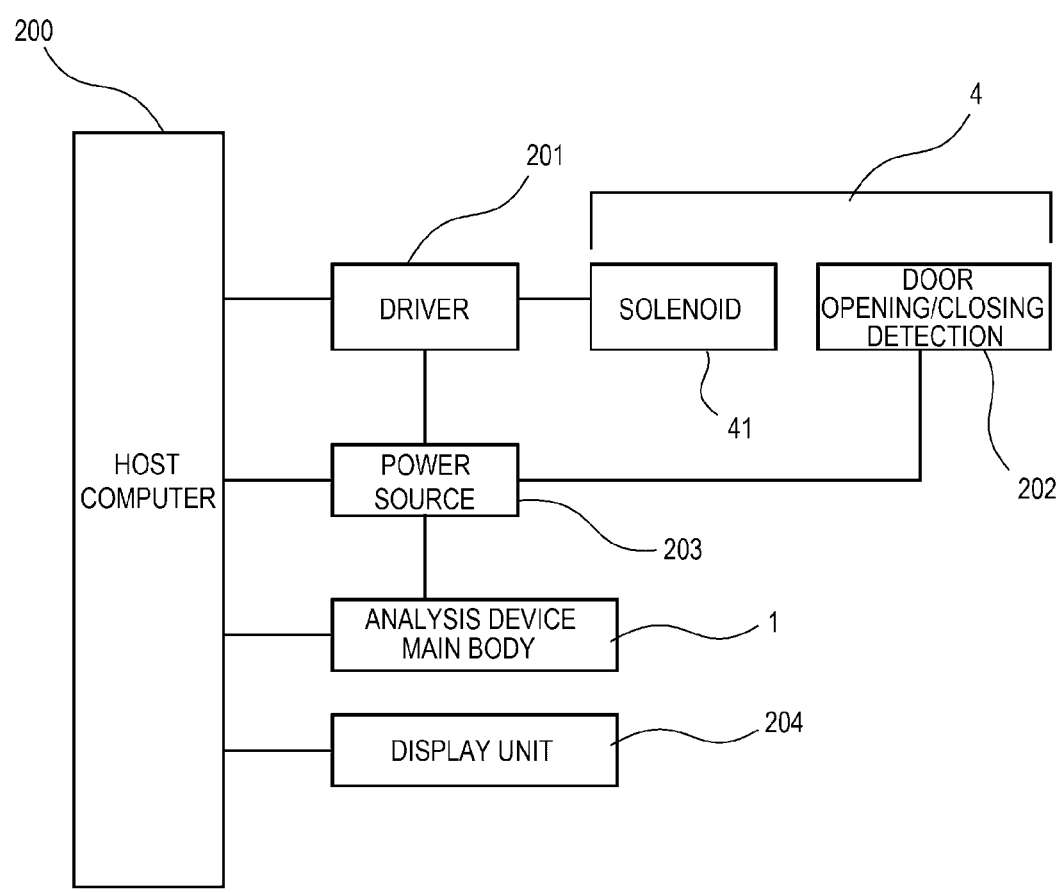

[FIG. 31]
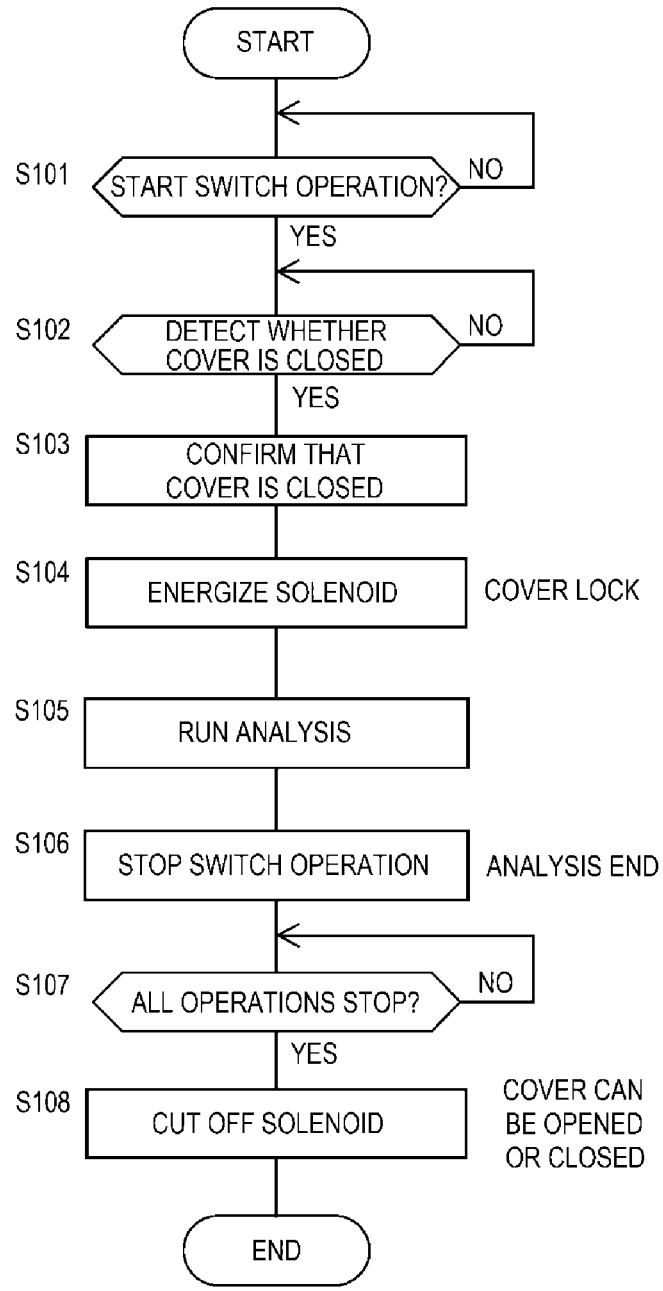

AUTOMATIC ANALYZER

TECHNICAL FIELD

The present invention relates to an automatic analyzer.

BACKGROUND ART

An automatic analyzer is a device that automatically analyzes blood and other biological samples and outputs the results, and is an indispensable device in hospitals and medical testing facilities. The automatic analyzer is required to perform a wider variety of inspections in a shorter time. On the other hand, in the automatic analyzer, an openable and closable safety cover equipped with an interlock mechanism (interlock unit) is provided on the upper part of the working surface where the analysis work is performed, and the safety cover is locked so that the safety cover does not open while the device is being driven, causing the device to stop and delay the inspection. In addition, when the operator replaces consumables, the device is stopped and the lock by the interlock mechanism is released so that the safety cover can be opened and closed, and the operator can access the working surface with the safety cover open to perform various tasks.

As a technique related to such an interlock mechanism, for example, JP-A-2013-076678 (PTL 1) discloses a specimen processing device for processing a specimen, the device including a processing device main body provided with an operation mechanism and operating the operation mechanism to execute a specimen processing operation, a cover that covers at least one operation mechanism, a lock mechanism that locks the cover to prohibit the opening of the cover, and a control unit that controls the lock mechanism, in which the control unit is configured to be able to set a first mode in which the cover is not unlocked until an instruction to release the lock is received from the user after the specimen processing operation by the operation mechanism is completed, and a second mode for automatically unlocking the cover after the specimen processing operation by the operation mechanism is completed.

CITATION LIST

Patent Literature

PTL 1: JP-A-2013-076678

SUMMARY OF INVENTION

Technical Problem

However, in the above-mentioned related art, no consideration is given to the maintainability of the lock mechanism. For example, when it is necessary to repair the lock mechanism while the cover is locked and the opening of the cover is prohibited, it is expected that access to the lock mechanism is not easy and the lock mechanism will be difficult to repair.

The present invention has been made in view of the above, and an object of the present invention is to provide an automatic analyzer capable of improving maintainability by facilitating access to an interlock unit.

Solution to Problem

The present application includes a plurality of units for solving the above problems. As an example, an automatic analyzer includes a housing that accommodates an analyzer for analyzing a specimen; a cover provided to cover an upper side of a working surface which is an upper surface of the housing, and pivotally supported around a support shaft provided on one side of a rear side on the upper surface of the housing between a closed position and an open position in an upper-lower direction; and an interlock unit provided on a front side on the upper surface of the housing, and capable of preventing the cover from rotating from the closed position to the open position, in which the interlock unit includes a hollow case provided on a lower side of an end of the front side at the closed position of the cover, and having a rectangular parallelepiped shape disposed at a position adjacent to a front surface of the inside of the housing; an operation member supported to be movable between a lock position and a lock release position on the upper surface of the case, and inhibiting rotation to the open position of the cover by engaging with a protruding portion provided on the end of the front side of the cover at the lock position; an electromagnetic driving unit for driving the operation member; and a driving connecting unit for connecting the operation member to the electromagnetic driving unit and driving the operation member by conveying an operation of the electromagnetic driving unit to the operation member, the housing has a front surface opening provided at a position on the front surface of the housing corresponding to the interlock unit and covered with a front plate detachable from the housing, and the interlock unit is provided to be attachable and detachable to and from the housing via the front surface opening in a state where the front plate is detached.

Advantageous Effects of Invention

Maintainability can be improved by facilitating access to the interlock unit.

BRIEF DESCRIPTION OF DRAWINGS

FIG. 4 is a perspective view showing a state where an interlock unit is attached to a frame.

FIG. 5A is a top view showing a lock release state of an interlock unit according to a first embodiment.

FIG. 5B is a cross-sectional view of FIG. 5A taken along the line A-A.

FIG. 6 is a perspective view showing the lock release state of the interlock unit.

FIG. 7 is a transparent view showing the lock release state of the interlock unit.

FIG. 8 is a cross-sectional view taken along the line A-A and showing a locked state of the interlock unit in FIG. 5A.

FIG. 9 is a transparent view showing the lock state of the interlock unit.

FIG. 10 is a cross-sectional view of FIG. 8 taken along the line B-B.

FIG. 11 is a cross-sectional view of FIG. 8 taken along the line C-C.

FIG. 12 is an exploded perspective view showing a configuration of the interlock unit.

FIG. 13 is a side view showing the locked state of the interlock unit.

FIG. 14 is a rear view showing the locked state of the interlock unit.

FIG. 15 is a cross-sectional view taken along the line A-A in FIG. 5A and showing the lock state of the interlock unit, and is a partially enlarged view of the vicinity of a lock claw.

FIG. 16 is a cross-sectional view taken along the line A-A in FIG. 5A and showing the lock state of the interlock unit, and is a partially enlarged view of the vicinity of the lock claw.

FIG. 17A is a rear view of the interlock unit, and is an explanatory view showing a reactive force when the interlock unit is locked in an L-shape.

FIG. 17B is a rear view of the interlock unit, and is an explanatory view showing a reactive force when the interlock unit is locked in a T-shape.

FIG. 18A is a rear view of the interlock unit, and is an explanatory view showing a dimension relationship between a lock lever and a lock receiving unit.

FIG. 18B is a rear view of the interlock unit, and is an explanatory view showing the dimension relationship between the lock lever and the lock receiving unit.

FIG. 19 is a cross-sectional view taken along the line A-A in FIG. 5A and showing the interlock unit, and is a view showing a drain passage for a liquid invading into the case.

FIG. 20 is a cross-sectional view taken along the line A-A in FIG. 5A and showing the locked state of the interlock unit, and is a partially enlarged view of the vicinity of the lock lever.

FIG. 21 is a cross-sectional view showing an operation when an abnormal locked state of the interlock unit is released.

FIG. 22 is a perspective view showing a configuration of a liquid guiding unit according to a second embodiment.

FIG. 23 is a cross-sectional view taken along the line A-A in FIG. 5A and showing a lock release state of an interlock unit according to a third embodiment.

FIG. 24 is a transparent perspective view showing the lock release state of the interlock unit.

FIG. 25 is a cross-sectional view taken along the line A-A and showing a locked state of the interlock unit.

FIG. 26 is a transparent perspective view showing the lock state of the interlock unit.

FIG. 27A is a top view of an interlock unit according to a fourth embodiment.

FIG. 27B is a cross-sectional view taken along the line A-A in FIG. 5A and showing the interlock unit according to the fourth embodiment.

FIG. 28 is a perspective view of an interlock unit according to a fifth embodiment.

FIG. 29 is a cross-sectional view of an interlock unit according to a sixth embodiment.

FIG. 30 is a block diagram showing an outline configuration of the automatic analyzer.

FIG. 31 is a flow chart showing operations of the interlock unit.

DESCRIPTION OF EMBODIMENTS

Hereinafter, embodiments of the present invention will be described with reference to the drawings.

First Embodiment

The first embodiment of the present invention will be described in detail with reference to FIGS. 1 to 21.

(1) Automatic Analyzer 1

Figure 1:
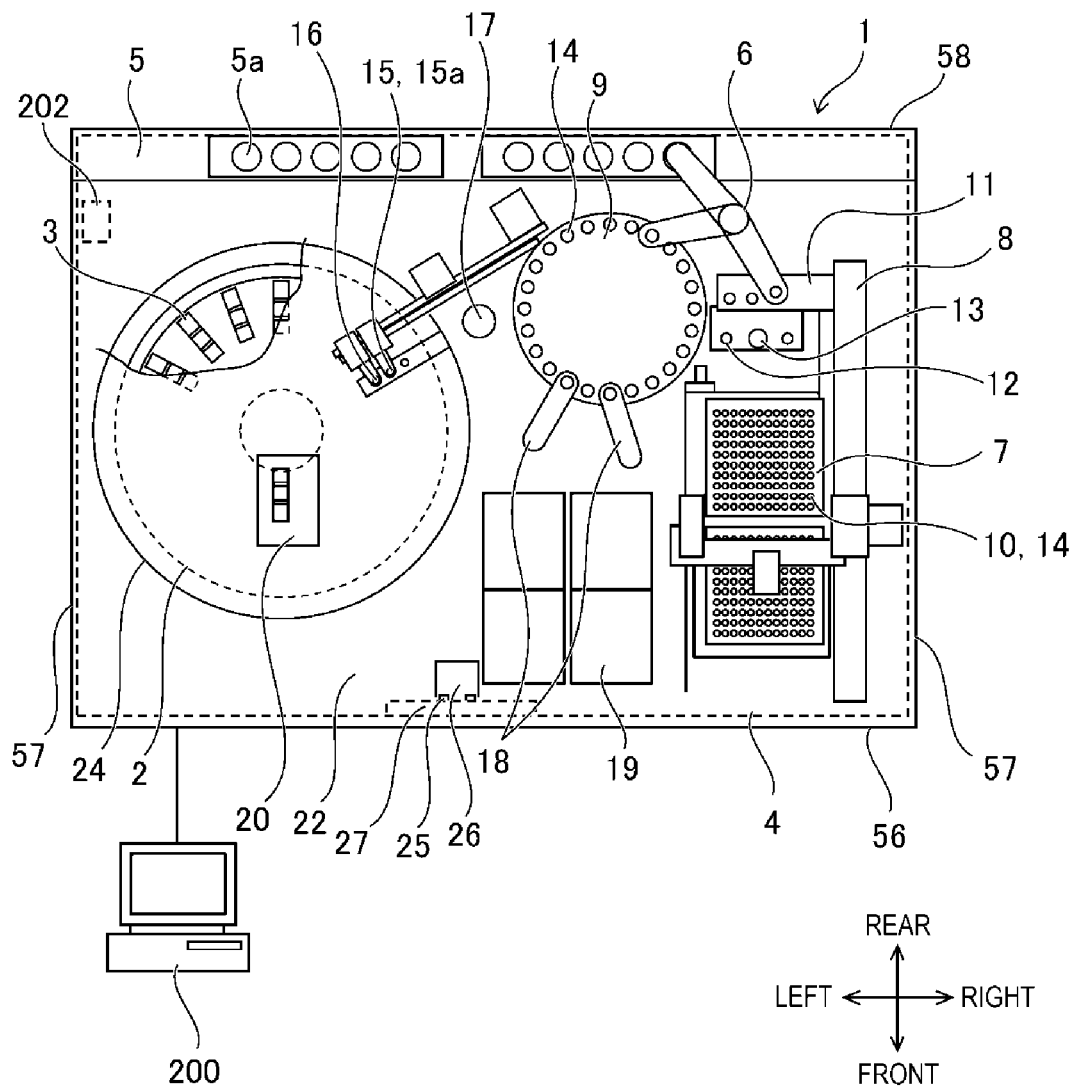
FIG. 1 is a plan view showing an overall configuration of an automatic analyzer including a reagent disk.
Figure 2:
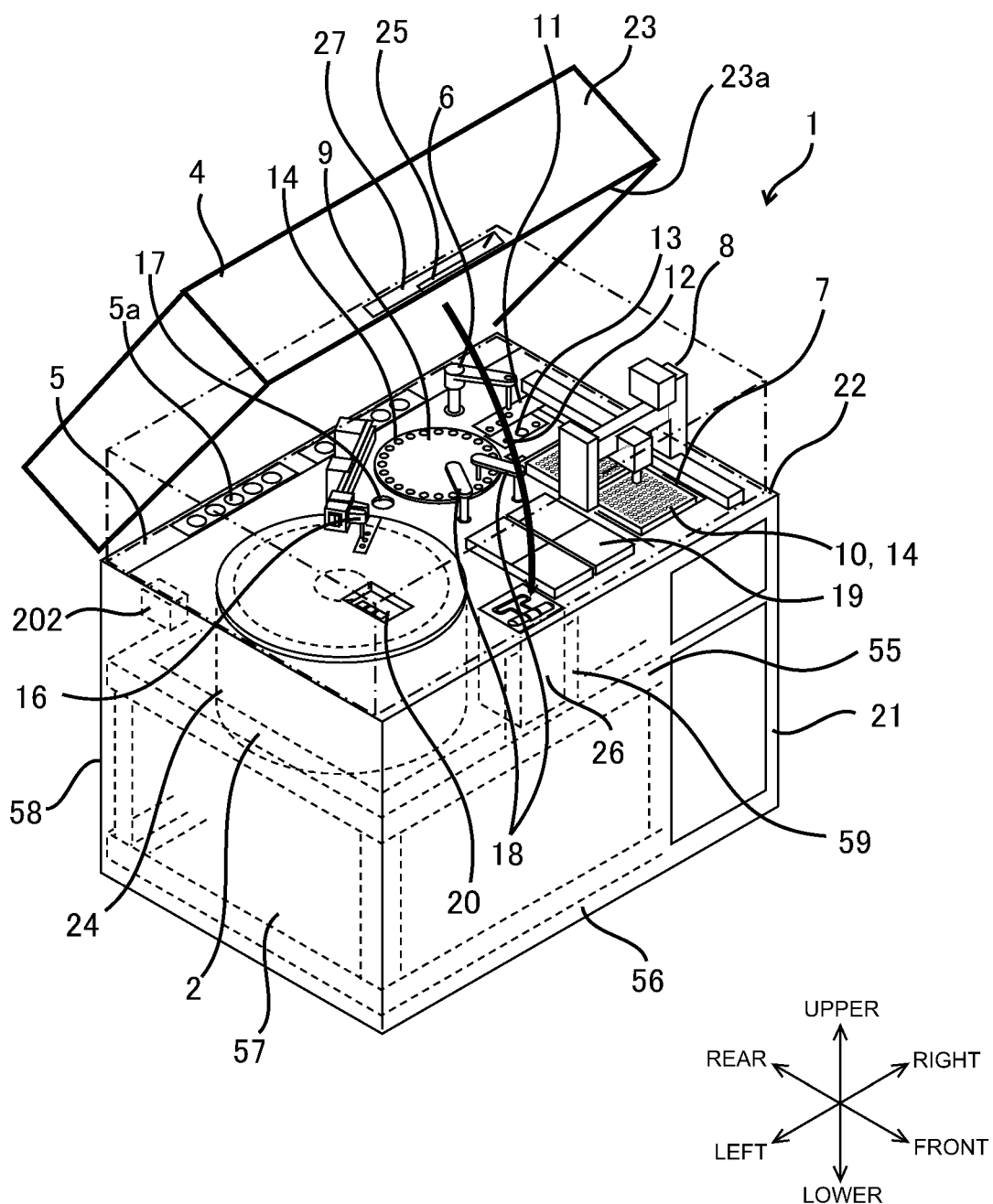
FIG. 2 is a perspective view showing a state where a safety cover of the automatic analyzer is opened.
Figure 3:
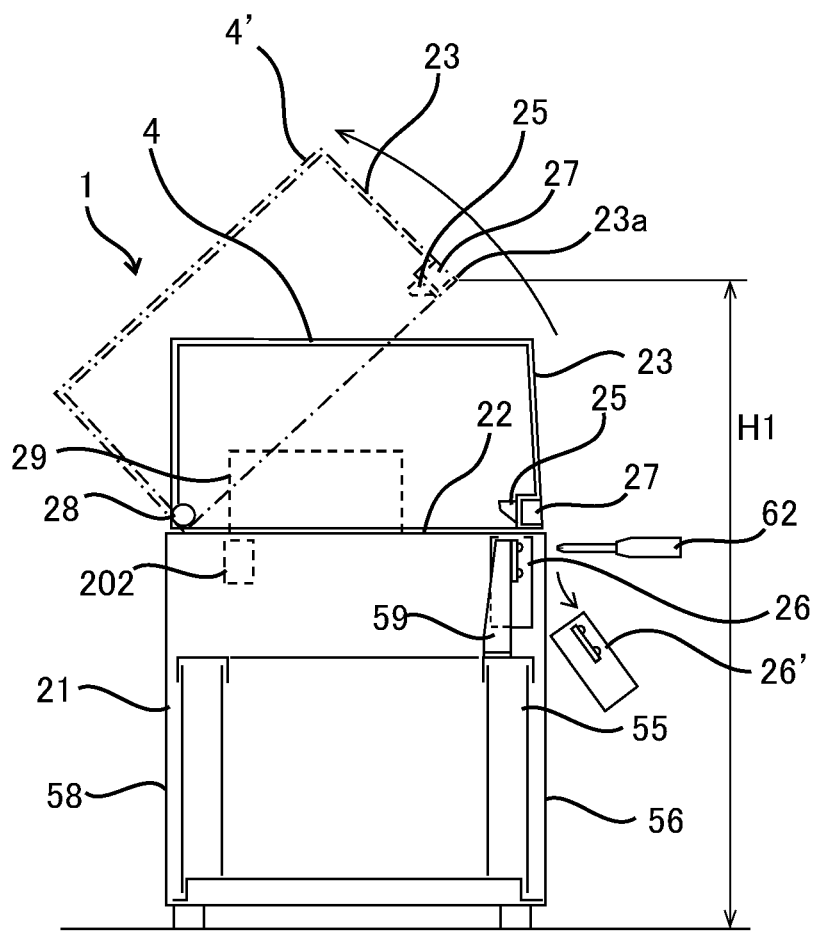
FIG. 3 is a left side view showing the state where the safety cover of the automatic analyzer is opened.

FIG. 1 is a plan view showing an overall configuration of an automatic analyzer including a reagent disk. Further, FIG. 2 is a perspective view showing a state where a safety cover of the automatic analyzer is opened, and FIG. 3 is a left side view. In the following description, when the automatic analyzer 1 is installed, the upper direction is defined as the upper side (upper), the lower direction is defined as the lower side (lower side), the side accessed by the operator of the automatic analyzer 1 is defined as the front side (front), the opposite side thereof is defined as the rear side (rear), the right direction when the automatic analyzer 1 is viewed from the front is defined as the right side (right), and the left direction is defined as the left side (left).

As shown in FIGS. 1 and 2, the automatic analyzer 1 includes a reagent disk (reagent vessel holder) 2, a safety cover 4, a sample transport unit 5, a sample dispensing unit 6, a tip rack 7, a transport unit 8, an incubator 9, a sample dispensing tip buffer 11, a disposal hole 12, an agitation unit 13, a reagent dispensing probe 15, an agitation unit 16, a cleaning unit 17, a reaction solution dispensing probe 18, a detecting unit 19, a housing 21, a working surface 22, and a reagent cool box (reagent storage) 24.

The housing 21 has a substantially rectangular parallelepiped shape to cover a front plate 56, a left and right side plate 57, a rear plate 58, and the upper surface, that is, a working surface 22 around a highly rigid housing frame 55 in which steel plates are joined by means such as welding or riveting, and houses the sample transport unit 5, the cleaning unit 17, the reagent cool box 24, a substrate (not shown), a flow path (not shown), and the like inside. The front plate 56, the left and right side plate 57, and the rear plate 58 are configured to be detachable during maintenance work.

The safety cover 4 is supported on one side of the upper surface of the housing 21 by, for example, a hinge, and is configured to be openable and closable around the hinge. The alternate long and short dash line in FIGS. 1 and 2 shows the state where the safety cover 4 is closed. The safety cover 4 is provided with an interlock that uses, for example, a solenoid as a drive source. During the operation of the automatic analyzer 1, the solenoid is energized to be latched and the safety cover 4 is maintained in a closed state. While the automatic analyzer 1 is stopped, the energization of the solenoid is released and the safety cover 4 can be opened.

The interlock is provided separately from the lock mechanism specified in ISO and the like, which restricts the opening and closing of the safety cover for the purpose of ensuring safety and is provided to prevent the analysis operation from a delay in the entire work resulted from being temporarily stopped when the operator accidentally opens the safety cover.

The interlock includes a lock receiving unit 25, which is a protruding portion that is provided substantially in the center of the left and right sides of a safety cover front side 24, which is the lower side of the front surface of the safety cover 4 (safety cover front surface 23), and faces backward from the front surface of the safety cover 4 (safety cover front surface 23), that is, protrudes toward the inside of the automatic analyzer; and a lock unit 26 (hereinafter, may be referred to as an interlock unit) that is provided at a position facing the lock receiving unit 25 on the working surface 22 when the safety cover 4 is closed, and acts on the lock receiving unit 25.

The interlock unit 26 is attached to the housing frame via a mounting bracket 59. The details of the configuration of the interlock unit 26 will be described later.

A door opening/closing detection 202 is connected to a power supply (not shown), and the power supply is connected to enable the automatic analyzer 1 to operate when the safety cover 4 is closed, and the power supply is cut off to stop the automatic analyzer 1 when the safety cover 4 is opened.

The sample transport unit 5 is configured of, for example, a belt conveyor, a rack handler, or the like, and moves a sample 5a in the automatic analyzer 1 to transport the sample 5a to the range of motion of the sample dispensing unit 6.

The tip rack 7 is configured to be attachable and detachable to and from the automatic analyzer 1 and is disposed on the upper surface of the automatic analyzer 1 by an operator in a state where a plurality of sample dispensing tips 10 and a plurality of reaction vessels 14 are placed therein.

The transport unit 8 is configured to be movable in the plane direction and the Z-axis direction and is configured to be movable above the tip rack 7, a part of the incubator 9, the sample dispensing tip buffer 11, the disposal hole 12, and the agitation unit 13. As the transport unit 8, for example, a triaxial robot or the like can be used. The transport unit 8 grips the reaction vessels 14 one by one from the tip rack 7 and moves the reaction vessels to the incubator 9. Further, the transport unit 8 grips the sample dispensing tips 10 one by one from the tip rack 7 and moves the sample dispensing tips to the sample dispensing tip buffer 11.

The sample dispensing tip buffer 11 is a buffer on which the sample dispensing tip 10 gripped by the transport unit 8 is temporarily placed. The sample dispensing tip buffer 11 is configured so that a plurality of sample dispensing tips 10 can be placed.

The incubator 9 has a substantial disk shape and is configured to be rotatable. The incubator 9 holds a plurality of reaction vessels 14 along the circumferential direction, and each reaction vessel 14 can be moved to a predetermined position by the rotation of the incubator 9.

The sample dispensing unit 6 moves to the upper part of the sample dispensing tip buffer 11, grips any one of the sample dispensing tips 10, moves to the upper part of the sample 5a and aspirates the sample 5a into the inside of the sample dispensing tip 10. After that, the sample dispensing unit moves to the upper part of the reaction vessel 14 on the incubator 9 and discharges the sample 5a from the inside of the sample dispensing tip 10 into the reaction vessel 14. After that, the sample dispensing unit 6 moves to the upper part of the disposal hole 12 and drops the sample dispensing tip 10 into the inside of the disposal hole 12.

The reagent cool box 24 has a substantially cylindrical shape and accommodates the reagent disk 2. A reagent vessel loading port 20 for attaching and detaching a reagent vessel 3 to and from the reagent disk 2 is provided on the upper surface of the reagent cool box 24. Further, the reagent vessel loading port 20 is provided with an openable and closable reagent vessel loading port cover (not shown). The reagent cool box 24 has a heat insulating function in order to control the reagent vessel 3 to a constant temperature.

The reagent disk 2 forms a slot for holding a plurality of reagent vessels 3 radially along the circumferential direction. The reagent disk 2 is configured to be rotatable around a central axis extending in the vertical axis direction, and by rotating the reagent disk 2, each reagent vessel 3 is moved to a predetermined position. For example, the rotation of the reagent disk 2 can move the reagent vessel 3 containing the target reagent to a reagent dispensing position 15a. The reagent vessel 3 may contain magnetic particles for agitating the reagent.

The reagent dispensing probe 15 is configured to be movable in the front-rear and left-right directions (horizontal direction) by, for example, an actuator. The reagent dispensing probe 15 aspirates a predetermined amount of the reagent from the reagent vessel 3 located at the reagent dispensing position 15a with a reagent dispensing probe (not shown) and dispenses the reagent into the reaction vessel 14 held in the incubator 9.

The agitation unit 16 is provided above the reagent dispensing position 15a and includes a magnetic particle agitating arm that is rotatable around a central axis extending in the vertical axis direction. At the lower end of the magnetic particle agitating arm, for example, a paddle-shaped or spiral-shaped magnetic particle agitating unit is provided. The magnetic particle agitating arm agitates the reagent by lowering and rotating the magnetic particle agitating unit in the reagent containing the magnetic particles. In order to prevent precipitation of magnetic particles in the reagent, the magnetic particle agitating arm agitates the reagent immediately before the reagent is dispensed by the reagent dispensing probe 15. After agitating, the magnetic particle agitating arm moves to the cleaning unit 17 containing the cleaning liquid and rotates the magnetic particle agitating unit for cleaning.

The reaction vessel 14 into which the predetermined reagent and the sample 5a are dispensed is managed to a predetermined temperature by the incubator 9, and the reaction is promoted for a predetermined time. The reaction solution of the reagent and the sample 5a is supplied from the reaction vessel 14 to the detecting unit 19 by the reaction solution dispensing probe 18 and the physical characteristics thereof are detected by the detecting unit 19. Examples of the physical characteristics include, but are not limited to, the amount of light emitted, the amount of scattered light, the amount of transmitted light, the current value, and the voltage value. The detecting unit 19 may perform the analysis while holding the reaction solution in the reaction vessel 14.

The reaction vessel 14 containing the reaction solution for which the analysis by the detecting unit 19 has been completed is moved to the upper part of the disposal hole 12 by the transport unit 8 and is discarded in the disposal hole 12. Depending on the type of measurement, one reaction vessel 14 may be used for a plurality of measurements. In that case, the reaction vessel 14 is washed after discarding the reaction solution in the reaction vessel 14 for which the analysis has been completed.

A host computer 200 is connected to the automatic analyzer 1, and a series of operations of the above configuration of the automatic analyzer 1 is controlled by the host computer 200. The automatic analyzer 1 can efficiently analyze a plurality of samples with respect to a plurality of analysis items by combining or repeating the above operations.

(2) Interlock Mechanism

In FIG. 3, the state where the safety cover 4 is closed is shown by a solid line, and the state where the safety cover 4 is opened is shown by an alternate long and short dash line. The front side of the safety cover 4 is provided with a handle portion 27, which is a concave portion into which a finger is inserted when the safety cover 4 is opened from the closed position. In the present embodiment, the lock receiving unit is provided so as to come into contact with the rear surface of the handle portion 27 and extend rearward.

The safety cover 4 is pivotally supported between the fully open position and the closed position around a cover support shaft 28 provided along the vicinity of the rear side of the main body, and if the safety cover 4 is opened to come into contact with a stopper (not shown) and supported by a support unit (not shown) not to be closed due to its own weight, the front side of the safety cover 4 rises to a height of H1. The operator can insert an arm or upper body through the gap between the working surface 22 and the front side of the safety cover 4 to clean or replace a group of various operation mechanisms 29 provided on the working surface 22, to clean the working surface 22, or to replace the reagent vessel 3. Therefore, it is desirable that the front side height H1 of the safety cover 4 has a sufficient height, and it is desirable that there are no partial protrusions or the like downward from the front side of the safety cover 4, or it is desirable to have a smooth outer shape even if there are protrusions.

It is effective that the handle portion 27 and the lock receiving unit 25 are provided close to the substantially central portion of the safety cover 4 in the left-right direction. In particular, it is particularly preferable to provide the lock receiving unit 25 on the back surface of the handle portion 27. That is, when the operator tries to open the safety cover 4 in the locked state, if the lock receiving unit 25 is provided in the vicinity of the handle portion 27 or on the back surface of the handle portion 27, the safety cover 4 is locked with slightly opened. On the contrary, there is a problem that when the lock receiving unit 25 is displaced to the left or right with respect to the handle portion 27, a moment is generated by the force of the hand trying to open the safety cover 4, and the reaction force from the lock receiving unit 25 trying to lock, and thus, the safety cover 4 tends to rise on the side of the handle portion 27 while being twisted, and the lifting amount on the side surface of the safety cover 4 on the side close to the handle portion 27 increases.

(3) Outline of Attaching Interlock Unit 26 to Frame 55

FIG. 4 is a perspective view showing a state where the interlock unit is attached to the frame.

The interlock unit 26 includes a case 47 having a substantially rectangular parallelepiped shape made of resin, a lock lever 35 which is an acting member provided on the upper surface of the case, and a solenoid 41 which is a driving unit provided on the lower surface of the case 47, and the case includes a driving connecting unit (driving connecting member) that connects the plunger of the solenoid 41 and the lock lever 35 to operate. The details will be described later.

As described above, the front plate 56 forming the front surface of the housing 21 is detachably provided during maintenance work such as periodic inspection, and FIG. 4 shows a state where the front plate 56 is detached and the front surface of the housing 21 is opened as a front surface opening. The interlock unit 26 is provided immediately behind the front plate 56 and configured to be screwed and fixed from the front via the mounting bracket 59 with respect to the housing frame 55 constituting the housing 21 via screw holes 105 by mounting screws 61. The interlock unit 26 is attached from the lower side of the working surface 22 through a working surface opening 22a provided on the working surface 22, and the upper surface is exposed from the working surface 22 and positioned and fixed so as to have substantially the same surface as the working surface 22. As an example, the mounting bracket 59 has a substantially U-shape that is symmetrical in the left and right in the top view and is provided with a mounting groove 60 that is a vertically long slit in which the upper end is opened in the center of the left and right in the front view and the lower end is connected to the left and right. Both the left and right sides of the mounting groove 60 facing the front surface is a unit mounting surface 93. The left-right width of the mounting groove 60 is larger than the case width of the interlock unit 26 and the interlock unit 26 can be arranged in the mounting groove 60 and screwed from the front by the mounting screw 61. Since the height of the mounting screw 61 is lower than the working surface 22 and the mounting screw 61 is arranged at a position to be able to be directly viewed from the front through the front surface opening if the front plate 56 of the housing 21 is detached, the mounting screw 61 can be easily attached and detached by the driver and maintainability is good. Therefore, attachment and detachment are easy, and assembly and maintainability are excellent.

Further, as shown in FIG. 3, since the interlock unit 26 is formed to be long in the upper-lower direction and short in the front-rear direction, even when the safety cover 4 is closed, if the mounting screw 61 is detached from the front by the driver 62 in the state where the front plate 56 is detached, the interlock unit 26 can be easily detached downward via the front surface opening. Therefore, even if the safety cover 4 cannot be opened in the locked state due to a failure or the like, the interlock unit 26 can be easily removed, and thus, maintainability is excellent. The suitable arrangement of the interlock unit 26, the mounting bracket 59, and the frame will be described later.

(4) Handle Portion 27 and Lock Receiving Unit 25

The handle portion 27, which is a concave portion for inserting fingers along the lower end, is provided on the front side of the safety cover 4 and is in contact with the rear surface of the handle portion 27, and a pair of left and right lock receiving units 25 protrudes rearward via a plate-shaped lock receiving base 30. The downwardly facing surfaces of the pair of lock receiving units 25 have inclined surfaces that are tapered so that the lock receiving units 25 become thinner toward the tip in a side view, and the left and right ends of the pair of lock receiving units 25 have inclined surfaces that are tapered so that the lock receiving units 25 become thinner toward the tip in a plan view, and the ridgeline on the side surface of the lock receiving unit 25 has an obtuse angle, thereby forming a smooth shape. The upper surface of the lock receiving unit 25 is an inclined surface whose height increases as the distance from the front surface of the safety cover 4 increases, and θ1, which is the angle formed by the vertical surface and the upper surface of the lock receiving unit 25, is an acute angle smaller than 90°. For example, if the lock receiving unit 25 is molded from POM (polyacetal) resin, a smooth shape can be easily created, which is suitable.

(5) Case 47

The case 47 of the interlock unit 26 has a substantially rectangular parallelepiped shape and includes a left side case 47a, a right side case 47b, and an upper surface case 47c. The left side case 47a and the right side case 47b are a pair of the left and right, and the outer shape is substantially symmetrical in the left and right. In the present embodiment, the left side case 47a and the right side case 47b have a form in which the width in the left-right direction is smaller than the length in the front-rear direction, and the height of the upper-lower direction is maximized. The solenoid 41, which is a drive source (actuator), fixes the plunger 42 upward on the lower surface of the case 47. The plunger 42, a connecting plate 40, a first gear 32, a second gear 38, and a pull spring 45, which are a driving connecting unit 53, are arranged in the case 47. The left side case 47a, the right side case 47b, and the upper surface case 47c can be integrally molded of, for example, ABS resin, and even a complicated shape can be realized at low cost, which is preferable.

(6) Positional Relationship between Lock Lever 35, Driving Connecting Unit 53, and Solenoid 41

Here, the lock lever 35, which is an acting member, is provided on the upper surface of the case 47, the solenoid 41, which is an actuator, is provided below the lower surface of the case 47, the driving connecting unit 53 for transmitting a driving force between the acting member and the actuator is provided, and the acting member, the driving connecting unit 53, and the actuator are arranged in a vertical row. Therefore, the projected area when viewed from above can be small, the configuration can be suitable for miniaturization of the housing 21, and the dimensions in the front-rear direction can be reduced, and thus, the interlock unit 26 can be placed along the front plate 56 in the rear portion of the housing 21 in the vicinity of the front plate 56.

(7) First Gear 32 and Lock Lever 35

A first support shaft 31 is integrally molded of, for example, ABS (acrylonitrile butadiene styrene) resin together with the left side case 47a, and is extended toward the right side case 47b in parallel with the safety cover front surface 23, and the tip of the first support shaft 31 is fitted to the first support bearing portion 63, which is a concave portion provided in the right side case 47b. The right side case 47b may also be molded of ABS resin in the same manner as the left side case 47a. The first gear 32 is pivotally supported around the first support shaft 31 via a first gear shaft hole 90. The teeth of the first gear 32 are provided around the first gear shaft hole 90 in a range of approximately 90°. A support rod portion 33 that is integrally molded with the first gear 32 and extended rearward, and the tip of the support rod portion 33 form a pair of lock portions 34 which are convex in the left-right direction in parallel with the first support shaft 31 with the support rod portion 33 interposed therebetween. The pair of lock portions 34 and the support rod portion 33 form the lock lever 35 having a substantial T-shape. The lock lever 35 is molded of, for example, POM resin, and the lock portion 34 has a flat upper surface and a tapered shape that becomes thinner toward the lower side in a side view viewed from the left and right when the lock is released, and the lower side has a substantially semi-cylindrical cross section that is smooth in a semi-cylindrical shape. Further, the pair of lock portions 34 have a rectangular shape extending in the left-right direction with R provided at the corners when viewed from the upper surface, and the lower half has a hemispherical smooth shape. The joint portion between the support rod portion 33 and the pair of lock portions 34 is smoothly connected in an R shape to prevent damage due to stress concentration. That is, the lock lever 35 is an example of an acting member that acts to lock the safety cover 4 with respect to the lock receiving unit 25.

(8) Other Examples of Shape of Lock Lever 35

Regarding the lock lever 35, the amount of protrusion of the pair of lock portions 34 in the left-right direction with respect to the support rod portion 33 does not have to be the same and the lock lever 35 may have an asymmetrical shape in which one is long and the other is short. Alternatively, the lock portion 34 may have a substantially L shape in a plan view, which is extended to only one side with respect to the support rod portion 33.

(9) Cylindrical Portion 48

From the gear tooth tip on the lower surface side of the first gear 32 to the support rod portion 33 is a cylindrical portion 48 having no teeth, which is equal to the tooth tip circle of the first gear 32.

(10) Positional Relationship Between Working Surface 22 and Lock Lever 35

The lock lever 35 is arranged so as to face the front-rear direction in parallel with the working surface 22 when the lock is released. The upper surface of the upper surface case 47c is provided on substantially the same surface as the working surface 22 and is provided with a concave portion for accommodating the lock lever 35 when the lock is released. That is, the left-right width of the upper surface case 47c is larger than the width of the concave portion for accommodating the lock lever 35. The upper surface of the lock lever 35 is configured to be flat and is flush with the upper surface of the upper surface case 47c. Further, the upper surface of the upper surface case 47c may be provided with a pair of left and right covering portions 36 having a partial columnar shape, which are gentle protrusions that cover the first support shaft 31 with the lock lever 35 interposed therebetween.

(11) Positional Relationship Between Covering Portion 36 and Lock Lever 35

In the lock release state, the portion of the upper surface of the lock lever 35 sandwiched between the pair of left and right covering portions 36 has a partial columnar shape similar to that of the covering portion 36, and the covering portion 36 and the lock lever 35 may be continuously and smoothly formed. Since no steps or protrusions are generated, when the user cleans the working surface 22, for example, a cleaning tool such as a cloth or a brush is not caught.

(12) Lock Portion 34

The inner distance between the pair of lock receiving units 25 in the left-right direction is larger than the width in the left-right direction of the support rod portion 33, and the support rod portion 33 is configured to be able to enter between the pair of lock portions 34. The total width of the pair of lock portions 34 in the left-right direction is larger than the width of the tips of the pair of lock receiving units 25 in the left-right direction. The lock portion 34 on the left side is configured to be able to be engaged with the lock receiving unit 25 on the left side, and the lock portion 34 on the right side is configured to be able to be engaged with the lock receiving unit 25 on the right side.

(13) Second Gear 38

The second support shaft 37 is provided integrally with the left side case 47a and extends parallel to the first support shaft 31 toward the right side case 47b, and the tip of the second support shaft 37 is fitted in a second support bearing portion 64, which is a concave portion provided in the right side case 47b. The second gear 38 is molded of, for example, POM resin, is pivotally supported around the second support shaft 37, and meshes with the first gear 32 to rotate. The number of teeth of the second gear 38 is provided within a range in which the first gear 32 can be rotated by 90° to 90° or more to stand up.

(14) Solenoid 41

The second gear 38 is provided with a connecting shaft 39 in parallel with the second support shaft 37, and one end of the connecting plate 40 is pivotally supported by the connecting shaft 39. The other end of the connecting plate 40 is pivotally supported by a driving pin 43 provided at one end of the cylindrical plunger 42 of the solenoid 41, which is an electromagnetic actuator. The plunger 42 is supported so as to be movable in the longitudinal direction with respect to the solenoid 41 and has a configuration in which when the solenoid 41 is energized from a power supply device (not shown), the plunger 42 is attracted so as to be close to the solenoid 41, and when the energization is released, the attractive force is released. In the present embodiment, the plunger 42 can be moved in the upper-lower direction, and a hole through which the driving pin 43, which will be described later, penetrates is provided in the left-right direction in the vicinity of the upper end of the plunger 42.

A first spring hooking portion 44 is provided at one end of the second gear 38, and one end of the pull spring 45 is hooked. The other end of the pull spring 45 is hung on a second spring hooking portion 46 provided integrally with the left side case 47a, and the spring force of the pull spring 45 is biased in a direction in which the plunger 42 is pulled out from the solenoid 41 via the second gear 38 to act as a return spring when the energization of the solenoid 41 is released.

(15) Driving Connecting Unit 53

The plunger 42, the connecting plate 40, the first gear 32, the second gear 38, and the pull spring 45 constitute the driving connecting unit 53 for transmitting the driving force between the solenoid 41 and the lock lever 35 when driving the lock lever 35.

(16) Case 47 (Left Side Case 47a and Right Side Case 47b)

A solenoid mounting portion 66 is provided integrally with the left side case 47a and arranged so that the mounting surface of the solenoid 41 faces rearward, and screws the housing of the solenoid 41 with a screw 107 from the front. The plunger 42 is arranged upward. A thin plate-shaped mounting seat 67a extending in the upper-lower direction is provided on the right side of the left side case 47a, and a thin plate-shaped mounting seat 67b extending in the upper-lower direction is provided on the left side of the right side case 47b. The interlock unit 26 can be screwed from the front surface to the mounting bracket 59 provided on the housing frame 55 of the housing 21 via the mounting seat 67a and the mounting seat 67b. The mounting seat 67a and the mounting seat 67b are provided at approximately the same as the first support shaft 31 in the front-rear direction when viewed from the left and right, or slightly in front of the first support shaft 31, that is, in the immediate vicinity of the lock receiving unit 25 provided on the safety cover 4. The strength of the mounting seats 67a and 67b is ensured by the reinforcement ribs 68.

(17) Width and Axial Stress of Case 47

When a load is applied to the first support shaft 31 and the second support shaft 37 supporting the first gear 32, the second gear 38, and the pull spring 45, and the first spring hooking portion 44, the maximum bending stress is generated at the root portion. In order to reduce this bending stress, it is effective to increase the shaft diameter and shorten the shaft length. Here, since the first support shaft 31, the second support shaft 37, and the first spring hooking portion 44 are molded of resin integrally with the left side case 47a, it is preferable to narrow the distance between the side wall portion 65a of the left side case 47a and the side wall portion 65b of the right side case 47b, that is, the width of the case 47 in order to shorten the length of the shaft. That is, by making the widths of the left side case 47a and the right side case 47b narrower than the width of the upper surface case 47c, or by making the widths of the left side case 47a and the right side case 47b narrower than the width of the lock lever 35 and the width of the solenoid 41, the stress can be reduced to obtain a highly reliable interlock unit 26.

That is, the left side case 47a and the right side case 47b have an expanded width in the vicinity of the upper surface facing the upper surface case 47c to form the upper surface case mounting portion 69, and a step 70a is provided between the side wall portions 65a and 65b. Further, a step 70b is provided between the solenoid mounting portion 66 and the side wall portions 65a and 65b.

(18) Snap Fit Claws 73

The right side case 47b is provided with so-called snap fit claws 71 for fitting to the left side case 47a, for example, at two locations, a front surface, and a rear surface. The left side case 47a is provided with a receiving portion 72 corresponding to the snap fit claw 71. The upper surface case 47c is provided with two snap fit claws 73 on the left and right for fitting to the right side case 47b and the left side case 47a, and the right side case 47b and the left side case 47a are provided with receiving portions 74 corresponding to the respective snap fit claws 73 and are fixed to each other by snap fit.

(19) Another Example of Connecting Left Side Case 47a and Right Side Case 47b

The left side case 47a may be provided with a female screw (not shown), a screw hole is provided at a corresponding position of the right side case 47b, and one or a plurality of screws may be used to fasten the right side case 47b and the left side case 47a to each other.

(20) Upper Surface Case 47c and Upper Surface Cover 76

The upper surface case 47c is provided with through holes 75 for passing the lock portions 34 protruding to the left and right of the lock lever 35 at the time of assembly between the first support shaft 31 and the front surface of the upper surface case 47c. The upper surface cover 76 can close the through hole 75 from above and is fixed to the upper surface case 47c from the inside by a snap fit claw 77. The front end of the upper surface case 47c is located in front of the front edge of the through hole 75, and the rear end of the upper surface case 47c is located behind the rear edge of the concave portion 49 in which the lock lever 35 is housed, thereby making a rectangular shape in a plan view. The outer circumference of the upper surface cover 76 is extended downward, and in the cross section in the left-right direction, it is configured to cover the upper surface case mounting portion 69 provided near the upper ends of the left side case 47a and the right side case 47b from the outside. The upper surface case mounting portion 69 of the left side case 47a and the right side case 47b functions as a case open prevention portion 91 that prevents deformation that spreads in the left-right direction.

(21) Case Surrounding Rib 47d

The upper surface of the upper surface case 47c is attached so as to pass through from below the working surface opening 22a opened in the working surface 22, making substantially the same surface as the working surface opening 22a. In this state, a case surrounding rib 47d, which is a rib protruding around the upper surface case 47c in a plan view, is provided slightly below the upper surface of the upper surface case 47c. With the interlock unit 26 attached, the case surrounding rib 47d is located slightly below the working surface 22, and the outer circumference of the case surrounding rib 47d is larger than the working surface opening 22a, and if the interlock unit 26 is attached, the gap formed between the upper surface case 47c and the working surface opening 22a is closed in a plan view to prevent the intrusion of a liquid or foreign matter.

(22) Connecting Plate 40

The connecting plate 40 has a substantial H-shape symmetrical when viewed from the front, and is molded of, for example, POM resin, and a driving pin hole 78 is bored at one end in the lower portion in the left-right direction and a connecting shaft hole 79 is bored at the other end in the upper portion in parallel with the driving pin hole 78.

The driving pin hole 78 at one end has a gap having a width slightly larger than the diameter of the plunger 42, and by sandwiching the plunger 42 inside the gap and penetrating the driving pin 43, the connecting plate 40 is pivotally supported with respect to the plunger 42. The connecting shaft hole 79 at the other end is pivotally fitted to the connecting shaft 39, which is a protrusion provided on the second gear 38 by a so-called snap fit. In order to facilitate the insertion of the snap-fit into the connecting shaft 39 portions, an inclined surface 80 open outward from the connecting shaft hole 79 may be formed. Alternatively, an inclined surface facing the inclined surface 80 may be formed at the tip of the connecting shaft 39.

(23) Second Gear 38 and Waterproof Rib 82

The second gear 38 is pivotally supported by fitting the second gear shaft hole 81 into the second support shaft 37. On the inner circumference of the gear teeth provided on a part of the outer circumference of the second gear 38, a thin plate portion cylindrical waterproof rib 82 larger than the tooth width in the left-right direction is provided integrally in a shape concentric with the second gear 38 and is extended so as to be close to the inner wall surface of each of the left side case 47a and the right side case 47b. The rear end side of the waterproof rib 82 has a shape that is extended downward and is configured so that the liquid dropped on the upper surface of the waterproof rib 82 flows through. The rear end of the waterproof rib 82 is located behind the plunger 42 and the connecting plate 40 of the solenoid 41 to be a first waterproof rib end 83. The front end of the waterproof rib 82 on the opposite side of the first waterproof rib end 83 is a second waterproof rib end 84.

(24) Labyrinth Structure (Case 47)

A first case rib 85 and a second case rib 86, which are concentric with the waterproof rib 82 and are partially arcuate and convex inward, are provided on the inner wall surfaces of the left side case 47a and the right side case 47b. The inner circumference of the first case rib 85 is larger than the outer circumference of the waterproof rib 82 of the second gear 38 and is arranged with a gap of, for example, about 1 mm. The outer circumference of the second case rib 86 is smaller than the inner circumference of the waterproof rib 82 of the second gear 38 and is arranged with a gap of, for example, about 1 mm. The first case rib 85 and the second case rib 86 are provided so as not to come into contact with the second gear 38, and the tips of the first case rib 85 and the second case rib 86 are arranged with a gap of, for example, about 1 mm from the left and right side surfaces of the second gear 38. That is, the first case rib 85, the second case rib 86, the waterproof rib 82, and the left and right side surfaces of the second gear 38 have a so-called labyrinth structure having an intricate cross-sectional shape. Since the first case rib 85, the second case rib 86, and the waterproof rib 82 are concentric circles, the labyrinth structure is maintained even if the second gear 38 rotates. The labyrinth structure prevents the liquid from passing between the first case rib 85 or the second case rib 86, and the waterproof rib 82.

(25) Gutter 87 and First Drain Port 88

The rear surface of the second case rib 86 extends vertically downward along the plunger 42 behind the plunger and the connecting plate 40 of the solenoid 41. The vicinity of the lower end of the second case rib 86 is seamlessly extended from the inner wall of the left side case 47a to the inner wall of the right side case 47b, and the lower surface thereof forms a gutter 87 that forms an inclined surface inclined so as to gradually decrease from the inner wall of the right side case 47b to the inner wall of the left side case 47a. The portion of the inner wall of the left side case 47a in contact with the gutter 87 is opened to form a first drain port 88.

(26) Third Case Rib 89 and Second Drain Port 92

A third case rib 89 is provided on the opposite side of the plunger 42 of the solenoid 41 from the gutter 87 and below the second support shaft 37. The third case rib 89 is integrally planted with the left side case 47a, and its lower end is in contact with the lower surfaces of the left side case 47a and the right side case 47b. After extending vertically upward from the lower end, it is bent in a direction close to the connecting plate 40, inclined to the vicinity of the lower part of the second support shaft 37, and extended to the third case rib end 106. Of the lower surfaces of the left side case 47a and the right side case 47b, a second drain port 92 is opened between the third case rib 89 and the front surfaces of the left side case 47a and the right side case 47b.

(27) Molding of Case 47

By using the left side case 47a, the right side case 47b, and the upper surface case 47c as resin molded parts, the liquid guide units such as the first case rib 85, the second case rib 86, the third case rib 89, and the gutter 87 and the drain ports 88 and 92 can be appropriately arranged together with the case, therefore, there is an effect that the number of parts can be reduced to realize a simple configuration.

(28) Assembling Procedure of Interlock Unit 26

Next, an example of the assembling procedure of the interlock unit 26 will be described.

The plunger 42 of the solenoid 41 and the connecting plate 40 are connected by passing the driving pin 43 through the driving pin hole 78. The connecting shaft hole 79 of the connecting plate 40 is fitted by a snap fit into the connecting shaft 39 provided in the second gear 38. The solenoid 41 is screwed to the solenoid mounting portion 66 provided integrally with the left side case 47a, and the second gear shaft hole 81 is passed through the second support shaft 37. One end of the pull spring 45 is hooked on the first spring hooking portion 44, and the other end is hooked on the second spring hooking portion 46. The first gear shaft hole 90 of the lock lever 35 is passed through the first support shaft 31, and when the plunger 42 is pulled out from the solenoid 41 by a predetermined amount, that is, an operating stroke amount by the pulling force of the pull spring 45, the lock lever 35 is arranged so as to be in the release position, the first gear 32 and the second gear 38 are engaged, and the right side case 47b and the left side case 47a are snap fitted or screwed together.

FIG. 8 is a sectional view taken along the line A-A showing the locked state of the interlock unit in FIG. 5A. As shown in FIG. 8, since the tips of the first support shaft 31, the second support shaft 37, and the first spring hooking portion 44 are fitted into the corresponding concave portions provided in the right side case 47b, the first support shaft 31, the second support shaft 37, and the first spring hooking portion 44 are not cantilevered but double-sided beams. Therefore, it is possible to reduce the stress generated when an external force is applied and realize a highly reliable interlock unit.

Next, after passing the lock portion 34 through the through hole 75 provided in the upper surface case 47c, the upper surface case 47c is sandwiched from above between the upper surface case mounting portion 69 which is the enlarged width portion of the upper surfaces of the left side case 47a and the right side case 47b. The through hole 75 is closed with an upper surface cover 76. The upper surface cover 76 is joined by a pair of snap fit claws 77 provided on the left and right sides and projecting outward by a so-called snap fit from the inside of the through hole 75.

Since the first support shaft 31, the second support shaft 37, the first spring hooking portion 44, and the solenoid mounting portion 66 are all provided integrally with the left side case 47a, the solenoid 41 and the driving connecting unit 53 are attached and held in the left side case 47a, and then, the right side case 47b and the upper surface case 47c can be attached to the left side case 47a, which makes the assembly easy.

(29) Upper Surface Cover 76c

The T-shaped concave portion 49 provided in the upper surface cover 76c has a bottomed shape with a bottom surface 50 to prevent foreign matters and liquids from falling from the concave portion 49 into the case 47.

(30) Operation of Solenoid 41

If the power supply is cut off due to a sudden power failure or the like while the safety cover 4 is locked and the automatic analyzer is operating, the interlock is desirably released and the safety cover 4 can be opened and closed. This is because if the safety cover 4 is left closed, post-treatment such as taking out the remaining reagent cannot be performed. As a configuration in which the interlock is released when the power is cut off, it is desirable to use a solenoid instead of a motor as the drive source because as a characteristic of this, the aspiration force of the solenoid disappears with a power failure, and therefore, the force of the return spring shifts from the locked state to the released state. When the drive source is a motor, the safety cover 4 cannot be opened because the safety cover does not operate in the locked position where the power supply is turned off.

(31) Positional Relationship Between Lock Lever 35 and Upper Surface Cover 76

By the way, when the safety cover 4 is opened and the operator handles a liquid such as a reagent solution, the liquid may be accidentally spilled on the working surface 22. If a watertight structure is to be used to prevent the spilled liquid from entering the inside of the interlock unit 26, a gap cannot be provided between the lock lever 35 and the upper surface cover 76, and thus, it is necessary to fill the gap with, for example, a rubber watertight member. However, with such a configuration, frictional resistance is generated when the lock lever 35 is rotated, and the operation of the lock lever 35 is hindered. When a motor is used as the drive source, it is possible to have a configuration in which deceleration is made by a gear or the like to increase the torque and drive against frictional resistance, but when a solenoid is used, due to the small operating stroke of the solenoid, it is generally used without deceleration, and thus, it is desirable to reduce the drive load as much as possible. Therefore, a watertight member cannot be used, and a gap is required between the rotating member and the fixing member so as not to interfere with the operation.

That is, since the lock lever 35 and the first gear 32 are integrally pivotally configured around the first support shaft 31, a gap enough to cause a backlash of, for example, about 0.2 to 0.5 mm is provided between the upper surface case 47c and the upper surface cover 76 so as not to hinder the rotation. Therefore, if a liquid such as a reagent solution is accidentally spilled in the vicinity of the lock lever 35, the liquid may enter the case through the gap. The liquid that has entered the case passes through, for example, the tooth surface or side surface of the first gear 32, then through the tooth surface or side surface of the second gear 38, and reaches the upper surface of the waterproof rib 82. Since the upper surface of the waterproof rib 82 has a cylindrical shape and the left and right side surfaces have a labyrinth structure that makes it difficult for liquid to pass through, the liquid on the upper surface of the waterproof rib 82 flows along the waterproof rib 82 toward the rear first waterproof rib end 83 or the front second waterproof rib end 84.

(32) Drain Passage

FIG. 19 is a cross-sectional view taken along the line A-A of the interlock unit in FIG. 5A, showing a drain passage of the liquid that has entered the case. As shown by an arrow in FIG. 19, provided is a first liquid guide portion that drops the liquid that has flowed rearward from the upper surface of the waterproof rib 82 toward the first waterproof rib end 83 into the gutter 87 from the first waterproof rib end 83 to drain the liquid from the first drain port 88 to the outside of the case. Provided is a second liquid guide portion that drops the liquid that has flowed forward from the upper surface of the waterproof rib 82 toward the second waterproof rib end 84 from the second waterproof rib end 84 to the portion between the front surface of the case and the third case rib 89 to drain the liquid from the second drain port 92 to the outside of the case.

(33) Liquid Guide Unit

The waterproof rib 82, the labyrinth structure provided with the waterproof rib 82, the first case rib 85 and the second case rib 86, the gutter 87, and the third case rib 89 described above form a liquid guide unit, and there is the effect of draining the liquid that has entered the inside of the case from the first drain port 88 or the second drain port 92 to the outside of the case 47 to prevent the liquid from flowing into the solenoid 41.

(34) Lock Release

FIG. 5A is a top view showing a lock release of the interlock unit according to the first embodiment, and FIG. 5B is a sectional view taken along the line A-A in FIG. 5A. Further, FIG. 6 is a perspective view showing a lock release of the interlock unit, and FIG. 7 is a perspective view.

In the states shown in FIGS. 5A to 7, energization of the solenoid 41 is released, the second gear 38 is rotated clockwise in FIG. 5B by the spring force of the pull spring 45, and the plunger 42 is pulled out to the maximum from the solenoid 41 via the connecting plate 40. The first gear 32 rotates counterclockwise in FIG. 5B and is stored in the concave portion 49 provided in the working surface 22 so that the upper surfaces of the support rod portion 33 and the pair of lock portions 34 are flush with the working surface 22. The concave portion 49 has a T-shape when viewed from the upper surface so that the T-shaped lock lever 35 can be stored, and is formed one size larger with a gap of, for example, about 1 mm from the periphery of the outer circumference of the lock lever 35 so as not to interfere with the outer circumference of the lock lever 35.

That is, in this state, since the lock portion 34 does not act on the lock receiving unit 25 provided on the safety cover 4, it is in the lock release, and the user can freely open and close the safety cover 4.

(35) Locked State

FIG. 8 is a sectional view taken along the line A-A showing the locked state of the interlock unit in FIG. 5A and FIG. 9 is a perspective view showing the locked state of the interlock unit. FIG. 10 is a cross-sectional view taken along the line B-B in FIG. 8, and FIG. 11 is a cross-sectional view taken along the line C-C in FIG. 8.

In the states shown in FIGS. 8 to 11, the locked state of the safety cover 4 is shown. When the safety cover 4 is closed, the plunger 42 is aspirated by a force exceeding the spring force of the pull spring 45 by energizing the solenoid 41, and the connecting plate 40 and the connecting shaft 39 are brought close to the solenoid 41 via the driving pin 43 to rotate the second gear 38 counterclockwise in FIG. 8. Since the first gear 32 meshes with the second gear 38, the first gear 32 rotates clockwise, and the support rod portion 33 and the lock portion 34 stand up from the working surface 22 and are brought into contact with the lock receiving base 30 to stop above the pair of lock receiving units 25 provided behind the handle portion 27 of the safety cover 4. In this state, when the user puts his finger on the handle portion 27 to lift the front surface of the safety cover 4 and try to open the safety cover 4, the lock receiving unit 25 rises together with the front surface of the safety cover 4, and the upper surfaces of the pair of left and right lock receiving units 25 come in to contact with the respectively corresponding lower surfaces of the pair of left and right lock portions 34 to prevent the safety cover 4 from opening. That is, it is in a locked state where the safety cover 4 cannot be opened.

(36) Arrangement of Lock Lever 35, First Gear 32, Second Gear 38, Connecting Plate 40, Plunger 42, and Solenoid 41

Since the lock lever 35, the first gear 32, the second gear 38, the connecting plate 40, the plunger 42, and the solenoid 41 are arranged on the same plane symmetrically, no force is generated to move in the left-right direction even when an upward external force is applied to the lock lever 35, and only pulling force is generated to the connecting plate 40, and thus it is possible to provide an interlock unit with stable operation and high reliability. Furthermore, if the left-right width of the interlock unit 26 is reduced, the first support shaft 31 and the second support shaft 37 can be shortened, and therefore, stress can be reduced, which is suitable for miniaturization and enables highly reliable interlock unit 26 to be realized.

(37) EMC Countermeasures

Since the safety cover 4 has a configuration that can rotate around the cover support shaft 28, when the safety cover 4 is made of resin, it is difficult to electrically ground the lock receiving unit 25 and the lock receiving base provided on the safety cover 4 because it requires connecting a ground wire. Further, since the lock lever 35 and the connecting drive member are movable parts, it is also difficult to electrically ground the above.

Therefore, not only the lock lever 35, the lock receiving unit 25, and the lock receiving base 30, but also the structural parts constituting the interlock unit 26 including the case 47 are made of resin molded parts instead of metal parts, thereby, not giving electromagnetic interference (EMI) to the surroundings. In addition, by increasing electromagnetic susceptibility (EMS), it is also possible to provide a highly reliable automatic analyzer with excellent electromagnetic compatibility (EMC) that can reduce noise mixing even when, for example, a cable through which a weak signal passes is arranged near the interlock unit 26.

(38) Mounting Surface and External Force Acting Surface

Next, a preferable arrangement of the mounting seats 67a and 67b of the interlock unit 26, the mounting bracket 59, and the housing frame 55 will be described with reference to FIGS. 13 and 4.

FIG. 13 is a side view showing the locked state of the interlock unit. As shown in FIG. 13, since the mounting seats 67a and 67b of the case 47 are provided substantially directly below the lock receiving unit 25 provided on the safety cover 4, the mounting bracket 59 is also located directly below the lock receiving unit 25. Therefore, when the user applies an upward external force to open the locked safety cover 4, the external force is transmitted to the left side case 47a and the right side case 47b from the lock portion 34 meshing with the lock receiving unit 25 via the first support shaft 31, and further transmitted to the mounting bracket 59 via the mounting seats 67a and 67b. Here, since the lock receiving unit 25, the mounting seats 67a and 67b, and the mounting bracket 59 are arranged vertically on substantially the same surface, an external force is applied to the mounting bracket 59 as a tensile load, and no bending moment is generated. Therefore, the interlock unit 26 is stable even if the interlock unit 26 receives an external force because the force of the out-of-plane deformation that the interlock unit 26 tries to move in the front-rear direction does not act when the interlock unit 26 receives an upward external force. Further, since the mounting bracket 59 is attached to the housing frame 55 as shown in FIG. 4, the external force is not transmitted to the working surface 22 and does not cause deformation of the working surface 22. Since the upward external force is transmitted to the strong housing frame 55 via the mounting bracket 59, it is possible to provide an automatic analyzer having high support rigidity and high reliability.

(39) Cap Effect of Upper Surface Case 47c

Next, the load applied to the left side case 47a and the right side case 47b will be described with reference to FIG. 14. FIG. 14 is a rear view of the locked state of the interlock unit. When the operator tries to open the safety cover 4 in the locked state, an upward load is generated on the lock lever 35 via the lock receiving unit 25, and the load is applied to the first support shaft 31. The first support shaft 31 is resin-molded integrally with the left side case 47a, and its tip is fitted into the first support bearing portion 63, which is a concave portion provided in the right side case 47b, to form a so-called double-sided beam. Here, when an upward load is applied to the first support shaft 31, if the fastening force between the left side case 47a and the right side case 47b is insufficient, since the left side case 47a and the right side case 47b are made of resin, the left side case 47a and the right side case 47b are bent in the direction of opening each other as shown in FIG. 14. Then, the tip of the first support shaft 31 is disengaged from the fitting of the concave portion, and the first support shaft 31 becomes a cantilever form. When compared with the form of the double-sided beam, the bending stress occurring at the base of the first support shaft 31 becomes large and there is a risk of breakage.

Therefore, as shown in FIG. 11, the upper surface case 47c is configured to cover the upper surfaces of the left side case 47a and the right side case 47b, and by providing a gap wider than the left and right widths of the left side case 47a and the right side case 47b, the cross-sectional shape of the upper surface case 47c forms a U-shaped case open prevention portion 91 having a large size and an open lower surface. That is, since the case open prevention portion 91 is configured to be fitted from the outside so as to prevent the upper surfaces of the left side case 47a and the right side case 47b from being deformed in the left-right outer direction. Since the left side case 47a and the right side case 47b do not open outward and the tip of the first support shaft 31 does not come off from the first support bearing portion 63 which is a concave portion provided in the right side case 47b even if an upward load is applied to the lock lever 35, it is possible to provide an automatic analyzer having high strength and high reliability without the first support shaft 31 becoming cantilevered and broken.

In this way, the strength between the left side case 47a and the right side case 47b can be obtained by attaching the upper surface case 47c, and thus, the left side case 47a and the right side case 47b may be assembled only by fitting with a snap fit without being screwed to each other.

(40) Acute Angle Effect of Lock Receiving Unit 25

Next, the detailed shapes of the lock portion 34 and the lock receiving unit 25 will be described with reference to FIGS. 15 and 16. FIGS. 15 and 16 are cross-sectional views taken along the line A-A in the locked state of the lock unit 26 of the safety cover 4 and are partially enlarged views in the vicinity of the lock lever portion.

In FIG. 15, the upper surface of the lock receiving unit 25 is an inclined surface whose height increases as the distance from the front surface of the safety cover 4 increases, and θ1 which is an angle formed by the vertical surface and the upper surface of the lock receiving unit 25 is an acute angle smaller than 90°. Further, the surface of the lock portion 34 that forms a part of the lock lever 35 and is close to the support rod portion 33 also has an acute angle smaller than 90°, which is approximately equal to θ1 and is formed as a vertical surface when the lock lever is upright.

That is, since the lower surface of the lock portion 34 and the upper surface of the lock receiving unit 25, which are in contact with each other, have acute angles, the reaction force generated when the user tries to open the safety cover 4 in the locked state is the lock portion 34. Since the lock receiving unit 25 works in a direction of attracting each other and approaching each other, the engagement between the lock portion 34 and the lock receiving unit 25 is further strengthened, and the locked state can be reliably maintained.

(41) Protrusion Effect of Lock Receiving Unit 25

As shown in FIG. 16, a protruding portion 51 that smoothly protrudes upward is provided at the rear end portion of the lock receiving unit 25 farthest from the front surface of the safety cover 4. FIG. 16 shows a case where, for example, the voltage applied to the solenoid 41 is reduced and the lock lever 35 does not rotate to the upright state shown in FIG. 15 but rotates to an angle θ2 smaller than a right angle. In such a case, the protruding portion 51 abuts on the semi-cylindrical portion on the rear surface side of the lock portion 34, and the reaction force when the safety cover 4 is opened acts in a direction separated from the first support shaft 31 and becomes the direction of the perpendicular line with respect to the contact surface, which is the first support. It acts in a direction separated from the shaft 31 by a radius R to generate a moment in a direction in which the lock lever 35 is close to the lock receiving base 30. Therefore, the lock lever 35 does not come off and can maintain the locked state.

(42) T-Shaped Effect

In the present embodiment, the lock lever 35 has a substantially L-shape in which the lock portion 34 is extended from the support rod portion 33 to one side, or constitutes the lock lever 35 having a substantially T-shape in which a pair of lock portions 34 are extended from the support rod portion 33 to both sides. The actions and effects of the substantially L-shape and the substantially T-shape will be described with reference to FIGS. 17A and 17B.

FIG. 17A shows a state where a reaction force F when the safety cover 4 is opened is applied to a substantially L-shaped lock lever 35 in which the lock portion 34 protrudes only to the left from the support rod portion 33. Since the reaction force F is applied only to the left lock portion 34, a bending moment M that bends the lock lever 35 to the right is generated, and the lock lever 35 bends to the right and tries to move to the right, so that the lock portion 34 and the lock receiving unit 25 are easily disengaged. Further, since the support rod portion 33 generates bending stress due to the bending moment M in addition to the tensile stress due to the reaction force F, the stress generated in the lock lever 35 becomes large.

FIG. 17B shows a state where a reaction force F when the safety cover 4 is to be opened is applied to the lock lever 35 having a substantially T-shape in the present embodiment.

The reaction force F is evenly applied (F/2) to the pair of left and right lock portions 34. Since the reaction force (F/2) is applied symmetrically to the support rod portion 33, no force is generated to move in either the left or right direction, and the lock lever 35 operates stably. Even if the reaction force (F/2) acts on a position deviated from the symmetrical position, the moment generated in the support rod portion 33 is only the product of the amount of deviation from the symmetrical position and the reaction force, and therefore, the bending moment is small, and almost only the tensile force acts.

In the lock lever 35 having a substantially T-shape, the pulling force due to the reaction force F is dominant in the support rod portion 33, and the bending moment is small. Therefore, even if the reaction force F is the same, the stress generated in the lock lever 35 is smaller than that of the substantially L-shaped lock lever 35 shown in FIG. 17A, and there is an effect that a more reliable automatic analyzer can be provided.

(43) Dimensions of Lock Lever 35

With reference to FIGS. 18A and 18B, a preferable dimensional relationship between the lock portion 34 of the lock lever 35 and the lock receiving unit 25 will be described. FIGS. 18A and 18B are schematic views showing a state where the safety cover 4 is fully shifted to the left with the interlock actuated, and an upward external force is applied to open the safety cover 4. In FIGS. 18A and 18B, L1 is the inner width of the lock receiving unit 25. L2 is the width of the straight portion of the side of the lower surface of the lock portion 34 that comes into contact with the lock receiving unit 25 and indicates the width of the straight portion of the tip of the lock portion 34 up to the front of the R portion. The difference between FIGS. 18A and 18B is that in FIG. 18A, L2 is small because the tip R of the lock portion 34 is large, while the width L1 of the lock receiving unit 25 is large, showing the relationship L1>L2. In FIG. 18B, L2 is large because the tip R' of the lock portion 34 is small, while the width L1 of the lock receiving unit 25 is small, showing the relationship of L1<L2.

In FIG. 18A, when an external force F is applied to the lock lever 35 and a load of F/2 is applied equally to the left and right lock receiving units 25, since the lock receiving unit 25 on the left side of the drawing is in contact with the tip R portion of the lock portion 34, the lock receiving unit 25 may shift upward along the tip R and move while deforming to be unlocked. On the other hand, if the relationship of L1<L2 is set as shown in FIG. 18B, since the lock receiving unit 25 on the left side does not shift to the position of the tip R' and comes into contact with the straight portion on the lower surface of the lock portion 34, the lock receiving unit 25 does not come off even when a load F is applied, and a highly reliable analyzer can be provided.

The above describes the state where the safety cover 4 is shifted to the left, but conversely, even in the state where the safety cover 4 is shifted to the right, the same operation is performed except that the left and right sides are symmetrical.

(44) Overrun Effect

FIG. 20 is a cross-sectional view taken along the line A-A of the locked state of the safety cover lock unit, which is a partially enlarged view of the vicinity of the lock lever portion, and shows a state where the operator applies a force forward to the handle portion 27 of the safety cover 4 and the safety cover 4 is bent and moved forward. Since the lock receiving unit 25 also moves forward together with the safety cover 4, it is desirable that the lock portion 34 further rotates by an angle θ3 so that the lock portion 34 moves forward rather than in the upright state of the lock lever 35, and even in the state where the safety cover 4 bends, the engagement between the lock portion 34 and the lock receiving unit 25 is reliable. Such a configuration can be achieved by appropriately selecting the operating amount of the plunger 42, and the number of teeth of the first gear 32 and the second gear 38 so that the lock lever 35 further rotates by an angle θ3 from the upright state when the plunger 42 of the solenoid 41 is aspirated to the maximum.

(45) Arrangement of the Interlock Unit 26

In the present embodiment, since the interlock unit 26 is arranged at the central portion of the front surface of the safety cover, the central portion is locked when the interlock unit 26 acts to lock the safety cover. Therefore, even if a force in the opening direction is applied to the left and right sides of the safety cover, the main body cover is not easily deformed and bent, and a gap is hard to open between the main body and the lower end of the main body cover.

The lock receiving unit 25 is configured to protrude rearward from the inside of the safety cover 4, and the lock lever 35 is configured to be rotated from the working surface 22 toward the front surface of the safety cover 4 from the inside to the front to act on and lock the lock receiving unit 25. Therefore, the amount of protrusion of the lock receiving unit 25 can be reduced to reduce the size, and the lock receiving unit 25 can have a smooth shape that is not a hook shape or a collar shape.

Further, since the lock receiving unit 25 is arranged in contact with the rear of the handle portion 27, when the operator applies a force in the opening direction to the handle portion 27 during locking, the opening operation of the safety cover 4 is surely hindered, which is suitable.

When the lock unit 26 is not working, the lock lever 35 is configured flushing to be the same surface as the working surface 22. Therefore, when the safety cover 4 is opened, the claw portion of the lock lever having a hook shape or a collar shape does not protrude from the working surface 22 and does not interfere with cleaning the working surface 22 with a cleaning tool such as a cloth or a brush.

Further, the concave portion for accommodating the lock lever 35 of the upper surface cover 76 is provided with a bottom to prevent liquid or foreign matters from falling from the concave portion.

(46) Drain Structure

Since the driving connecting unit (drive connecting member) connecting the actuator and the lock lever is provided with the liquid guide unit and the case is provided with the drain port, liquids such as water and reagents that have entered the inside of the case from the gap around the lock lever provided on the upper surface cover 76 are drained from the drain port to the outside of the case via the liquid guide unit and do not reach the actuator provided at the lower end of the case. Therefore, it is possible to provide a highly reliable interlock unit having a simple structure and being able to be miniaturized, and an automatic analyzer equipped with the interlock unit.

(47) Lock Abnormality Release

When the interlock unit 26 remains in the locked state because the energization is not released due to, for example, a circuit failure, an example of the operation of mechanically releasing the lock and opening the safety cover 4 will be described. FIG. 21 is a cross-sectional view showing an operation when releasing the abnormally locked state of the interlock unit.

In the present embodiment, there is no step or protrusion that becomes an obstacle between the lower surface 94 of the handle portion on the front surface of the safety cover 4 and the working surface 22, and a release piece 95 can be inserted from the front until the release piece touches the lock lever 35 from the gap between the lower surface 94 of the handle portion and the working surface 22. When the release piece 95 is pushed further rearward, the lock lever 35 is rotated rearward around the first support shaft 31 via the release piece 95, and the lock portion 34 is moved from the lock receiving unit 25 to be separated. Therefore, the safety cover 4 can be opened in that state.

As described above, the lock lever 35 can be unlocked even if the interlock unit 26 breaks down and does not operate in the locked state without having a special mechanical unlock mechanism. Therefore, the safety cover 4 can be opened to replace the reagent or take out the specimen before repairing or replacing the failed interlock unit 26.

However, the above operation is a case where the lock lever 35 is not stuck and can be rotated rearward, although the lock lever 35 cannot be released in the locked state.

(48) Replacement of Interlock Unit 26

Next, the configuration will be described in which even if the interlock unit 26 fails and does not operate in the locked state, and the lock lever 35 is stuck and does not move, the failed interlock unit 26 can be easily replaced.

In the present embodiment, as shown in FIGS. 4 and 13, the interlock unit 26 is fixed to the mounting bracket 59 fixed to the housing frame 55 from the front with mounting screws 61 and is detachably fixed via the front surface opening that is generated on the front surface when the front plate 56 is removed. As shown in FIGS. 2 and 3, since the interlock unit 26 is arranged close to the rear portion of the front plate 56 of the housing 21, it can be easily visually recognized by removing the front plate 56. Since the mounting screw 61 is mounted within the range of the front surface opening below the working surface so that it can be directly viewed from the front surface, the mounting screw 61 can be removed by the driver 62 even when the safety cover 4 is kept closed. Further, if the interlock unit 26 is moved forward and downward and the connector 54 that supplies power to the solenoid 41 is disconnected, the failed interlock unit 26 can be removed from the housing 21 in a short time. Further, since the interlock unit 26 that operates normally can be attached in the reverse procedure, it is possible to provide an automatic analyzer with good maintainability. Needless to say, if the failed interlock unit 26 is removed, the safety cover 4 can be opened at that time.

(49) Vertically Stacked Arrangement

As described above, the shape of the interlock unit 26 for facilitating the attachment/detachment of the interlock unit 26 from the front surface is desirably a vertically long shape having a large dimension in the upper-lower direction but a small in the front-rear direction. On the contrary, if the interlock unit 26 has a horizontally long shape having a large dimension in the front-rear direction, there is a problem that when removing the interlock unit 26, the interlock unit 26 cannot be removed unless it is moved significantly forward due to the large depth dimension, and the upper surface of the upper surface cover 76 is easily caught when the interlock unit 26 is attached or detached because the upper surface of the interlock unit 26 is fitted into the opening of the working surface 22 when the installation of the interlock unit 26 is completed.

On the other hand, in the case of the vertically long shape, if the interlock unit 26 is moved downward while rotating forward after removing the mounting screw 61, the upper surface and the opening of the working surface 22 are disengaged, and the interlock unit 26 can be easily removed with a small amount of movement.

That is, the lock lever 35, which is an acting member acting on the lock receiving unit 25, is provided on the upper surface of the interlock unit 26, and the solenoid 41, which is an electromagnetic driving unit, is arranged at the lower end so that the solenoid 41 is vertically elongated and the operation direction of the plunger 42 is the upper-lower direction. Further, the first gear 32, the second gear 38, the connecting plate 40, the pull spring 45, and the like are provided between the lock lever 35 and the solenoid 41. Since the driving connecting unit for connecting and moving the lock lever 35 so as to move between the non-operating position and the operating position according to the energization to the solenoid 41 is provided, the interlock unit 26 as a whole has a vertically long shape with a small depth and a large upper-lower direction.

(50) Mounting Position of Solenoid 41

Since the solenoid 41 is arranged below the case 47 so as to be exposed to the outside air, heat dissipation is better than when the solenoid 41 is arranged inside the case 47, and the temperature does not rise even if the locked state is continued for a long time, the interlock unit 26 with high reliability without overheating can be realized. Further, when the solenoid 41 is arranged on the bottom surface of the case 47, the liquid that has entered the case 47 may collect on the bottom surface of the case and infiltrate the solenoid 41. On the other hand, in the present embodiment, a drain port in contact with the bottom surface of the case 47 is provided at a position higher than the solenoid 41 to prevent liquid from accumulating inside the case 47, and the liquid drained from the drain ports 88 and 92 is discharged outside the case, the liquid does not infiltrate the solenoid 41, and a highly reliable interlock unit 26 can be realized.

Second Embodiment

A second embodiment of the present invention will be described with reference to FIG. 22. In the drawing, the same members as those in the first embodiment are designated by the same reference numerals, and the description thereof will be omitted.

FIG. 22 is a perspective view of the second gear 38 used in the interlock unit 26, and the difference from the first embodiment is that the lower side of the waterproof rib 82 forming a part of the second gear 38 is not horizontal in the left-right direction but an inclined side, and the first waterproof rib end 83 has a sharpened shape. With such a shape, the liquid dripping on the waterproof rib 82 reaches the first waterproof rib end 83 along the inclined side and drips from the first waterproof rib end 83. If the first waterproof rib end 83 has a sharp shape, the amount of liquid remaining on the first waterproof rib end 83 is smaller than that in the case of the horizontal shape, so that it is possible to provide a highly reliable interlock unit 26 with an improved drainage property. Alternatively, the first waterproof rib end 83' may be inclined toward either the left or right side, in this case, the liquid flows so as to be close to the inner wall of the side surface of the case on the side inclined downward along the first waterproof rib end 83', and flows along the inner wall of the side surface of the case due to the surface tension of the liquid. Here, it is desirable to incline the first waterproof rib end 83' downward in a direction close to the first drain port 88 because the drainage property is further improved.

Third Embodiment

The third embodiment of the present invention will be described with reference to FIGS. 23 to 26.

The difference from the first embodiment of the present embodiment is that a lock lever cover portion 52 is provided so as to protrude upward from the working surface 22 and open at the front, and the lock lever 35 is provided with the lock portion 34 having a hook shape at the upper end instead of T-shape, the upper surface of the lock lever 35 is not on the same surface as the working surface 22 in the lock release, and the lock lever 35 is in a standby position in the lock lever cover portion 52 in the lock release.

FIG. 23 is a cross-sectional view taken along the line A-A in FIG. 5A of the lock release of the interlock unit according to the present embodiment, and FIG. 24 is a perspective view. Further, FIG. 25 is a cross-sectional view taken along the line A-A in FIG. 5A in the locked state of the interlock unit, and FIG. 26 is a perspective view. In the drawing, the same members as those in the first embodiment are designated by the same reference numerals, and the description thereof will be omitted.

In the present embodiment, the lock receiving unit 25 is not provided as a pair on the left and right but is provided at one position facing the lock lever 35.

The connecting shaft 39 is provided integrally with the lock lever 35, and when the plunger 42 is attracted to the solenoid 41, the hook-shaped lock portion 34 at the tip of the lock lever 35 is configured to rotate forward around the first support shaft 31 to engage with the lock receiving unit 25 via the connecting plate 40 and the connecting shaft 39. The lock receiving unit 25 is not a pair but is provided at one position corresponding to the lock lever 35.

A waterproof rib 96 is provided on the connecting plate 40 that connects the driving pin 43 of the plunger 42 and the connecting shaft 39 and is inclined so that the front is high and the rear is low. One end of the rear is bent further downward, and the lower end is a waterproof rib end 97. The lower end of a fourth case rib 98 is integrated with the bottom surface of the case 47, and the upper end is arranged behind the connecting plate 40 and in front of the waterproof rib end 97. A drain port 99 is provided between the fourth case rib 98 and the rear lower end portion of the case 47.

The liquid that has entered the case through the gap around the lock lever 35 flows rearward along the slope on the upper surface of the waterproof rib 82, drops from the waterproof rib end 97 onto the fourth case rib 98, and is drained from the drain port 99 to the outside of the case 47.

In FIGS. 23 and 24, the plunger 42 of the solenoid 41 is moved away from the solenoid 41 by the pull spring 45, and the lock lever 35 rotates around the first support shaft 31 counterclockwise in the drawing. Then, the hook-shaped lock portion 34 provided at the upper end of the lock lever 35 is separated from the lock receiving unit 25, and the lock portion 34 and the lock receiving unit 25 are not engaged with each other, so that the safety cover 4 is in a lock release where the operator can open and close the safety cover 4.

In FIGS. 25 and 26, the solenoid 41 is energized and the plunger 42 overcomes the tensile force of the pull spring 45 and is aspirated by the solenoid 41. Since the connecting shaft 39 moves in the direction close to the solenoid 41 via the connecting plate 40, the lock lever 35 rotates clockwise around the first support shaft 31 in the drawing, and the lock portion 34 moves above the lock receiving unit 25. This state is the same locked state as in FIG. 9 in the first embodiment.

In the present embodiment, in the lock release, the lock lever 35 is housed inside the lock lever cover portion 52 instead of being flush with the working surface, and since the rotation angle of the lock lever 35 from the lock release to the locked state is smaller than that of the first embodiment, the first gear 32 and the second gear 38 provided in the first embodiment are unnecessary, which has the effects that the number of parts is small, and the configuration is simple.

Also in the present embodiment configured as described above, the engaging portion between the lock portion 34 and the lock receiving unit 25 has an acute angle as shown in FIG. 15 of the first embodiment, the lock receiving unit 25 is provided with a protruding portion 51 as in the case of FIG. 16, and is further rotated by the angle θ3 as in the case of FIG. 20, so that the engagement between the lock portion 34 and the lock receiving unit 25 can be further ensured as in the first embodiment.

In addition, also in the present embodiment, as in the first embodiment, mechanical unlocking as shown in FIG. 21 is possible, and if the front plate 56 is removed from the housing 21, it is needless to say that the interlock unit 26 is configured to be attachable/detachable as shown in FIG. 3.

Fourth Embodiment

The fourth embodiment of the present invention will be described with reference to FIGS. 27A and 27B.

FIG. 27A is a top view of the lock release of the interlock unit 26 according to the fourth embodiment of the present invention, and FIG. 27B is a cross-sectional view taken along the line A-A in FIG. 5A.

The difference of the present embodiment from the first embodiment is that a hole IC 100 for detecting magnetism is provided in contact with the lower surface of the upper surface cover 76, and a magnet 101 is provided at a position, which is the lower surface of the handle portion of the safety cover 4 facing the hole IC 100 when the safety cover 4 is closed.

When the safety cover 4 is closed, the hole IC 100 detects magnetism and transmits a signal, and when the safety cover 4 is opened, the magnet 101 is separated and the hole IC 100 does not detect magnetism, and thus, the signal is interrupted. With such a configuration, since the opening/closing detection of the safety cover 4 can be built in the interlock unit 26, it is not necessary to separately provide an opening/closing detection element, and the wiring from the hole IC 100 and the wiring from the solenoid 41 can be combined into one connector 54, and thus, the configuration becomes simple and the reliability can be further improved.

Fifth Embodiment

A fifth embodiment of the present invention will be described with reference to FIG. 28.

FIG. 28 is a perspective view of the interlock unit according to the present embodiment. The present embodiment is a modification of the lock lever 35 form, and the difference from the first embodiment is that the shape of the lock lever 35 is not substantially T-shaped, and the two left and right support portions 33a and 33b are provided symmetrically, and the tips of the respective support portions 33a and 33b are connected to form the lock portion 34 extending in the left-right direction. The lock receiving unit 25 is provided only at one place in the center, unlike the lock receiving units 25 provided at two places symmetrically in the first embodiment, and is configured to act on the lock portion 34 when the lock lever 35 stands up.

Also in the present embodiment, as in the first embodiment, it is possible to provide a highly reliable automatic analyzer capable of reliably locking the safety cover 4 and easily attaching and detaching the interlock unit 26.

Sixth Embodiment

The sixth embodiment of the present invention will be described with reference to FIG. 30.

The difference of the present embodiment from the third embodiment is that the lock receiving unit 25 is provided so as to face the rear side of the front surface lower portion 102 of the safety cover in which the handle portion 27 is extended downward, instead of the back surface of the handle portion 27 of the safety cover 4.

In FIG. 30, the lock lever 35 is arranged below the working surface 22, and the lock portion 34 protrudes towards the rear surface the front surface lower portion 102 of the safety cover from the front surface opening of the step portion 103 provided between the working surface 22 and the front plate 56 of the housing 21 facing the lock receiving unit 25, acts on the lock receiving unit 25 and locks the safety cover 4. The liquid that has entered from the periphery of the lock lever 35 flows forward along the slope on the upper surface of the waterproof rib 96 provided on the connecting plate 40, and drops between the inner front surface of the case 47 and a fifth case rib 104 planted from the bottom surface of the case to be discharged from the drain port 99.

FIG. 31 is a block diagram showing a configuration of a part related to the driving operation of the interlock unit in the present embodiment.

A drive signal is transmitted from a host computer 200 that controls the overall operation of the automatic analyzer 1 to the driver 201 that drives the solenoid 41, power is supplied to the driver 201, and the solenoid 41 can be driven based on the drive signal from the host computer 200. A door opening/closing detection 202 is connected to a power supply 203, supplies power when the safety cover 4 is closed, and shuts off the power supply when the safety cover 4 is open. A display unit 204 can display the operating state of the automatic analyzer 1 or display an alarm when an abnormality is detected to notify the operator.

FIG. 32 is a flowchart showing the operation of the interlock unit according to the present embodiment.

As shown in FIG. 32, the following processing is performed when the automatic analyzer 1 is operated. That is, it is determined whether or not the start switch of the automatic analyzer 1 has been operated (step S101), and if the determination result is NO, the determination in step S101 is repeated until the start switch is operated.

Further, when the determination result in step S101 is YES, that is, when the start of processing is instructed, the door opening/closing detection 202 determines whether or not the safety cover 4 is closed (step S102), and if the determination result is NO, the determination in step S102 is repeated until the determination result becomes YES.

If the determination result in step S102 is YES, that is, when the safety cover 4 is closed, the closure of the safety cover 4 is confirmed (step S103), the solenoid 41 is energized, and the safety cover 4 is locked (cover lock) (step S104).

Subsequently, the automatic analyzer 1 is operated to analyze the specimen (step S105), and when the analysis is completed, the stop switch is operated to start the stop process (step S106).

It is determined whether or not the operation st p of each part of the automatic analyzer 1 has stopped (step S107). If the determination result is NO, the process of step S107 is repeated until the determination result becomes YES.

If the determination result in step S107 is YES, the energization of the solenoid 41 is cut off (step S108), and the process ends. When the solenoid 41 lock is released, the safety cover 4 can be opened and closed, and thus, samples and reagents can be taken out, replaced, and supplied.

<Effect>

The effects of the present invention configured as described above are summarized below.

That is, in the present invention, the lock lever 35 is arranged so as to face the front-rear direction in parallel with the working surface 22 when the lock is released, and a concave portion for accommodating the lock lever 35 when the lock lever 35 is released is provided on the upper surface case 47c provided on substantially the same surface as the working surface 22. The upper surface of the lock lever 35 is flat and has a smooth shape so as to be flush with the working surface 22. Therefore, when the safety cover 4 is opened in the lock release, there is no protrusion from the working surface 22, and when the operator opens the safety cover 4 to perform the cleaning or replacement of a group of various operation mechanisms 29, the cleaning of the working surface 22, and the replacement of the reagent vessel 3, there is no hindrance, and when cleaning the working surface 22, the cleaning tool such as a cloth or a brush does not get caught, and thus, there is an effect that an easy-to-use automatic analyzer can be provided.

Further, in the present invention, the lock receiving unit 25 provided so as to protrude from the rear surface of the safety cover 4 or the front side of the handle portion 27 has a smooth shape rather than a hook shape, the cleaning tool such as a cloth or a brush does not get caught, and thus, there is an effect that an easy-to-use automatic analyzer can be provided.

Further, if the lock lever 35 has a substantially T-shape in which the lock portions 34 protrude from the support rod portion 33 on both the left and right sides, the reaction force F generated in the lock lever 35 when the safety cover 4 is substantially symmetrically in the left and right to the lock support rod portion 33, no force is generated to move the lock lever 35 in either the left or right direction, and the lock lever 35 operates stably. Further, since the support rod portion 33 is configured such that the tensile stress is dominant and the bending moment is small, there is an effect that a highly reliable automatic analyzer 1 with a small stress can be provided.

Further, by making the width L2 of the straight portion of the side that comes into contact with the lock receiving unit 25 on the lower surface of the lock portion 34 larger than the inner width L1 of the lock receiving unit 25, even when an upward external force is applied to the direction opening the safety cover 4 in a state of being shifted to the left and right, the lock is not released, and there is an effect that a highly reliable automatic analyzer 1 can be provided.

Further, since the lock portion 34 is configured to rotate further by the angle θ3 so as to move forward from the upright state of the lock lever 35, the engagement between the lock portion 34 and the lock receiving unit 25 is ensured even when the safety cover 4 is bent. There is an effect that it is possible to provide a highly reliable automatic analyzer 1 that can securely close the safety cover 4 in a locked state.

Further, since the concave portion 49 provided in the upper surface case 47c for accommodating the lock portion 34 is bottomed to prevent liquids and foreign matters from falling from the concave portion 49, there is an effect that a highly reliable automatic analyzer with a simple structure can be provided.

Further, since the lock lever 35 and the driving connecting unit 53 form the interlock unit 26 covered with a case 47 made of a resin molded product, there is an effect that it is easy to assemble and replace the unit, and a highly reliable automatic analyzer with a simple structure can be provided.

Further, the lock lever 35, which is an acting member, is pivotally provided on the upper surface of the case 47 of the interlock unit 26, and the solenoid 41, which is an actuator, is provided on the lower surface of the case 47, the driving connecting unit 53 that transmits a driving force between the acting member and the actuator is provided, and the acting member, the driving connecting unit 53, and actuator are arranged in a vertical row, and thus, the projected area when viewed from above can be reduced, the configuration is suitable for miniaturizing the housing 21, and the dimensions in the front-rear direction can be reduced. Therefore, there is an effect that the interlock unit 26 can be arranged in the rear portion near the front plate 56 of the housing 21 along the front plate 56.

Further, in the case 47, the range of the side wall where the support shaft for supporting the gear and the spring is planted has a narrower width than those of the upper surface case mounting portions 69a and 69b, and the length of the support shaft for supporting the gear and the spring is shortened. Therefore, the stress generated when a load is applied can be reduced, and a highly reliable interlock unit can be realized.

Further, since the solenoid 41, which is an electromagnetic driving unit, is provided below the case 47 to be exposed to the outside air, the heat dissipation is better than when the solenoid 41 is arranged in the case, and even if the solenoid 41 is continuously energized, overheating does not occur, whereby, a highly reliable interlock unit can be realized.

Further, even if a liquid such as a reagent spills into the inside of the case 47 through the gap on the upper surface of the case 47, a drain port for discharging the liquid to the outside of the case 47 and a liquid guide unit for guiding the liquid to the drain port are provided. Therefore, there is an effect that a highly reliable automatic analyzer without flowing into the solenoid 41 can be provided.

Further, the case 47 includes the left side case 47a, the right side case 47b, and the upper surface case 47c, each of which is molded of resin, and the rotary support shafts 31 and 37 of the gear and the spring hooking portion 44 are integrally molded with the case. Further, since the first gear 32 and the lock lever 35 are integrated and the second gear 38 and the waterproof rib 82 are integrally molded, there is an effect that the number of parts can be reduced and the configuration can be made inexpensive. Further, by covering the outer surface of the upper surface of the left side case 47a and the right side case 47b with the case open prevention portion 91 in which the outer circumference of the upper surface case 47c is extended downward, it is possible to prevent the left side case 47a and the right side case 47b from being deformed in the opening direction even when the lock lever 35 receives an upward load. Therefore, since it is possible to prevent the first support shaft 31 from being cantilevered and damaged, there is an effect that a highly reliable automatic analyzer can be provided. Furthermore, since the rigidity of the left side case 47a and the right side case 47b can be obtained by the case open prevention portion 91 of the upper surface case 47c, the assembly may be possible only by locking by so-called snap fit without screwing, and an inexpensive configuration is possible.

Further, when the lock lever 35 is in an abnormal lock state where the lock lever 35 does not return in the locked state, the release piece 95 is inserted into the gap between the lower side of the safety cover 4 and the working surface 22 and the lock lever 35 is pushed from the front. As a result, the lock lever 35 can be rotated rearward to release the lock, and the safety cover 4 can be opened. Therefore, even if the interlock unit breaks down, the abnormal lock can be easily released, and thus, an easy-to-use automatic analyzer can be provided.

Further, since the interlock unit 26 is configured to be screwed to the mounting bracket 59 attached to the housing frame 55 from the front, it is easy to mount and remove, and the assemblability and maintainability are excellent. Furthermore, even if the lock lever 35 is stuck and does not return, the configuration is made to be attachable and detachable via the front surface opening generated on the front surface when the front plate 56 of the housing is removed. Since the interlock unit 26 can be removed from the front and the lower part by removing the above, the unit can be replaced in a short time, and the maintainability is excellent.

Further, although the drive source connected to the driving connecting unit 53 is the solenoid 41, the drive source is not limited to the solenoid and may be a motor such as a stepping motor, a DC motor, or an AC motor, and further, a deceleration unit such as a spur gear or a worm gear may be further provided between the motor and the lock lever. Alternatively, an actuator operated by compressed air or hydraulic pressure may be used as a power supply.

Further, although the lock lever 35 that rotates around the axis in the left-right direction has been described as an example of the acting member, the present invention is not limited to such a lock lever, and may be a linear motion member that repeats the projection and retraction in the up-down direction, the left-right direction, or the front-rear direction, or may be a rotary member that rotates around a rotation axis in the upper-lower direction.

Further, the unit mounting surface 93 of the mounting bracket 59 and the mounting seat 67 of the interlock unit 26 are extended in the upper-lower direction, and the mounting screw 61 is described as being detached from the front in the horizontal direction. The unit mounting surface 93 and the mounting seat 67 are not limited thereto, and for example, the upper end may be inclined so as to be rearward from the lower end, and the screw may be attached/detached by inserting a driver from diagonally above.

<Others>

The present invention is not limited to the above-described embodiments and includes various modifications. For example, the above-described embodiments have been described in detail in order to explain the present invention in an easy-to-understand manner, and do not necessarily include all the described configurations. In addition, a part of one embodiment can be replaced with the configuration of another embodiment. It is also possible to add the configuration of another embodiment to the configuration of one embodiment. It is also possible to delete a part of the configuration of each embodiment.

For example, each of the above-described embodiment describes as an example the case where, in the interlock unit 26, the solenoid 41, which is a driving unit, is arranged below the lock lever 35, which is an acting member, and the lock lever 35 arranged up and down by the driving connecting unit (driving connecting member) 53, and the solenoid 41 are connected to each other and the lock lever 35 is driven by the solenoid 41, but the present invention is not limited thereto, and the present invention can also be applied when an interlock unit, in which the solenoid 41 is arranged behind the lock lever 35 and connected by the driving connecting unit 53, is used.

REFERENCE SIGNS LIST

1: Automatic analyzer
2: Reagent disk
3: Reagent vessel
4: Safety cover
5: Sample transport unit
6: Sample dispensing unit
7: Tip rack (sample dispensing tip/reaction vessel supply unit)
8: Sample dispensing tip/reaction vessel transport unit
9: Incubator
10: Sample dispensing tip
11: Sample dispensing tip buffer
12: Sample dispensing tip/reaction vessel disposal hole
13: Reaction solution agitation unit
14: Reaction vessel
15: Reagent dispensing probe
15a: Reagent dispensing position
16: Agitation unit
17: Cleaning unit
18: Reaction solution aspiration nozzle
19: Detecting unit
20: Reagent vessel loading port
21: Housing
22: Working surface
22a: Working surface opening
23: Safety cover front surface
23a: Safety cover front side
25: Lock receiving unit
26: Lock unit (interlock unit)
27: Handle portion
28: Cover support shaft
29: Group of various operation mechanisms
30: Lock receiving base
31: First support shaft
32: First gear
33: Support rod portion
34: Lock portion
35: Lock lever
36: Covering portion
37: Second support shaft
38: Second gear
39: Connecting shaft
40: Connecting plate
41: Solenoid
42: Plunger
43: Driving pin
44: First spring hooking portion
45: Pull spring
46: Second spring hooking portion
47: Case
47a: Left side case
47b: Right side case
47c: Upper surface case
47d: Case surrounding rib 48: Cylindrical portion
49: Concave portion
50: Bottom surface
51: Protruding portion
52: Lock lever cover portion
53: Driving connecting unit
54: Connector
55: Housing frame
56: Front plate
57: Side plate
58: Rear plate
59: Mounting bracket
60: Mounting groove
61: Mounting screw
62: Driver
63: First support bearing portion
64: Second support bearing portion
65, 65a, 65b: Side wall portion
66: Solenoid mounting portion
67, 67a, 67b: Mounting seat
68: Reinforcement rib
69: Upper surface case mounting portion
70a, 70b: Step
71: Snap fit claw
72: Receiving portion
73: Snap fit claw
74: Receiving portion
75: Through hole
76: Upper surface cover
77: Snap fit claw
78: Driving pin hole
79: Connecting shaft hole
80: Inclined surface
81: Second gear shaft hole
82: Waterproof rib
83: First waterproof rib end
84: Second waterproof rib end
85: First case rib
86: Second case rib
87: Gutter
88: First drain port
89: Third case rib
90: First gear shaft hole
91: Case open prevention portion
92: Second drain port
93: Unit mounting surface
94: Handle portion lower surface
95: Release piece
96: Waterproof rib
97: Waterproof rib end
98: Fourth case rib
99: Drain port
100: Hole IC
101: Magnet
102: Safety cover front surface lower portion
103: Step portion
104: Fifth case rib
105: Screw hole
106: Third case rib end
107: Mounting screw
200: Host computer
201: Driver
202: Door opening/closing detection
203: Power supply
204: Display unit

The invention claimed is:
1. An automatic analyzer comprising:
a housing configured to accommodate an analyzer configured to analyze a specimen;
a cover provided to cover an upper side of a working surface which is an upper surface of the housing, and configured to be pivotally supported around a support shaft provided on one side of a rear side on the upper surface of the housing between a closed position and an open position in an upper-lower direction, and
the cover includes a protruding portion provided on the end of a front side of the cover; and
an interlock unit provided on a front side on the upper surface of the housing, and capable of preventing the cover rotating from the closed position to the open position, wherein the interlock unit includes:
a hollow case provided on a lower side of an end of a front side at the closed position of the cover, and having a rectangular parallelepiped shape disposed at a position adjacent to a front surface of an inside of the housing;
a lock lever having a L- or T-shape comprising a support rod portion and a pair of lock portions extending from the support rod portion, and the lock lever configured to be movably supported between a lock position and a lock release position on an upper surface of the hollow case, and inhibiting rotation to the open position of the cover by engaging with the protruding portion provided on the end of the front side of the cover at the lock position;
a solenoid configured to drive the lock lever; and
a mechanical linkage configured to connect the lock lever to the solenoid and drive the lock lever by conveying an operation of the solenoid to the lock lever,
the housing has a front surface opening provided at a position on the front surface of the housing corresponding to the interlock unit and covered with a front plate detachable from the housing, and
the interlock unit is provided to be attachable and detachable to and from the housing via the front surface opening in a state where the front plate is detached;
Note: all of the functional/process language in the instant allowed claims (e.g. "configured to be pivotally supported", "configured to be movably supported", "configured to drive the lock lever", etc.,) have been given full patentable weight by the examiner; The determination of whether the functional/process language limits a claim is made on a case-by-case basis in light of the facts in each case; In certain instances, functional/process recitations recited in apparatus type claim are not limiting; However, in this case the functional language in the claims have received given patentable weight because it clearly defines a specific structural feature or mechanism that performs a function, rather than simply describing the intended use or result of the invention; The instant claimed functional/process language is supported by the specification and provides a clear understanding of the claimed invention to someone skilled in the art; essentially, the function/process language is tied to a defined structure or process, not just a general concept.
2. The automatic analyzer according to claim 1, wherein the interlock unit is disposed at a position corresponding to a substantial center of a front side of the cover on the housing.

3. The automatic analyzer according to claim 1, wherein the housing includes:
- a frame configured to form a frame body of the housing; and
- an interlock unit mounting bracket provided in the frame, the hollow case at least covers the driving connecting unit, and holds the lock lever and the solenoid integrally, and the interlock unit is fixed to the housing by fixing the hollow case to the interlock unit mounting bracket with mounting screws accessible through the front surface opening.

4. The automatic analyzer according to claim 1, wherein a plate-shaped release piece is provided to reach the lock lever of the interlock unit between a lower end of a front side of the cover at the closed position of the cover and the upper surface of the housing and connects an inside and an outside of the cover, and the lock lever obstructs the rotation to the open position of the cover at the lock position moved from a rear side close to a front side with respect to the cover by engaging with the protruding portion, and allows rotation to the open position of the cover at the lock release position estranged from the front side to the rear side with respect to the cover, and the rotation to the lock release position can be realized by inserting the plate-shaped release piece from a front side to a rear side of the cover.

5. The automatic analyzer according to claim 1, wherein the interlock unit includes:
- the lock lever configured to obstruct the rotation to the open position of the cover by engaging with the protruding portion provided on the end of the front side of the cover on the upper surface of the housing at the lock position;
- the solenoid provided on a lower side of the operation member and configured to drive the lock lever; and
- the driving connecting unit extending in the upper-lower direction so as to connect the lock lever and the solenoid and configured to drive the lock lever by conveying the operation of the solenoid to the lock lever.

* * * * *